(12) United States Patent
Sun

(10) Patent No.: US 9,808,983 B2
(45) Date of Patent: Nov. 7, 2017

(54) POLYMERIC MATERIAL FOR CONTAINER

(71) Applicant: Berry Plastics Corporation, Evansville, IN (US)

(72) Inventor: David Dezhou Sun, Evansville, IN (US)

(73) Assignee: Berry Plastics Corporation, Evansville, IN (US)

( * ) Notice: Subject to any disclaimer, the term of this patent is extended or adjusted under 35 U.S.C. 154(b) by 163 days.

(21) Appl. No.: 14/475,096

(22) Filed: Sep. 2, 2014

(65) Prior Publication Data

US 2015/0061192 A1 Mar. 5, 2015

Related U.S. Application Data

(60) Provisional application No. 61/872,260, filed on Aug. 30, 2013, provisional application No. 61/872,368, filed on Aug. 30, 2013, provisional application No. 61/872,183, filed on Aug. 30, 2013.

(51) Int. Cl.
*B29C 49/22* (2006.01)
*B29C 49/04* (2006.01)
(Continued)

(52) U.S. Cl.
CPC ............... *B29C 49/22* (2013.01); *B29B 11/10* (2013.01); *B29C 47/0023* (2013.01); *B29C 47/0054* (2013.01); *B29C 47/065* (2013.01); *B29C 47/56* (2013.01); *B29C 49/0005* (2013.01); *B29C 49/04* (2013.01); *B29B 2911/14166* (2013.01); *B29C 49/4252* (2013.01); *B29C 49/46* (2013.01); *B29C 49/4817* (2013.01); *B29C 2049/4608* (2013.01); *B29C 2049/627* (2013.01); *B29C 2791/006* (2013.01); *B29C 2791/007* (2013.01); *B29K 2023/065* (2013.01);
(Continued)

(58) Field of Classification Search
CPC ...................................................... B29C 49/22
See application file for complete search history.

(56) References Cited

U.S. PATENT DOCUMENTS 3,221,954 A  12/1965  Lux
3,290,198 A  12/1966  Lux
(Continued)

FOREIGN PATENT DOCUMENTS

CA  2752335  3/2012
CN  1484602  3/2004
(Continued)

OTHER PUBLICATIONS

English Translation of JP404278340A, 23pages.
(Continued)

*Primary Examiner* — Larry Thrower
(74) *Attorney, Agent, or Firm* — Barnes & Thornburg LLP

(57) ABSTRACT

A vessel is configured to hold a product in an interior region formed in the vessel. The vessel includes an inner layer arranged to define the interior region and an outer layer. The vessel is formed using a blow-molding process in which a multiple layer parison is blow molded to form the vessel. The multiple layer parison is formed in an extrusion process in which a number of extruders are arranged to co-extrude associated inner and outer parisons to establish the multiple layer parison.

22 Claims, 3 Drawing Sheets

(51) Int. Cl.

| | | |
|---|---|---|
| *B29C 49/00* | (2006.01) | |
| *B29C 47/56* | (2006.01) | |
| *B29C 47/00* | (2006.01) | |
| *B29C 47/06* | (2006.01) | |
| *B29B 11/10* | (2006.01) | |
| *B29K 23/00* | (2006.01) | |
| *B29L 31/00* | (2006.01) | |
| *B29C 49/42* | (2006.01) | |
| *B29C 49/46* | (2006.01) | |
| *B29K 105/04* | (2006.01) | |
| *B29C 49/48* | (2006.01) | |
| *B29C 49/62* | (2006.01) | |

(52) U.S. Cl.
CPC .. *B29K 2105/04* (2013.01); *B29K 2995/0063* (2013.01); *B29L 2031/712* (2013.01)

(56) References Cited

U.S. PATENT DOCUMENTS

| | | |
|---|---|---|
| 3,892,828 A | 7/1975 | Weatherly |
| 3,981,412 A | 9/1976 | Asmus |
| 4,047,868 A | 9/1977 | Kudo |
| 4,206,166 A | 6/1980 | Hayashi |
| 4,220,730 A | 9/1980 | Coyne |
| 4,435,344 A | 3/1984 | Lioka |
| 4,468,435 A | 8/1984 | Shimba et al. |
| 4,479,989 A | 10/1984 | Mahal |
| 4,553,999 A | 11/1985 | Ziegler |
| 4,867,664 A | 9/1989 | Fukuhara |
| 4,990,382 A | 2/1991 | Weissenstein |
| 5,037,285 A | 8/1991 | Kudert |
| 5,037,684 A | 8/1991 | Dundas |
| 5,328,651 A | 7/1994 | Gallagher |
| 5,332,121 A | 7/1994 | Schmidt |
| 5,405,667 A | 4/1995 | Heider |
| 5,574,074 A | 11/1996 | Zushi |
| 5,575,965 A | 11/1996 | Caronia |
| 5,598,940 A | 2/1997 | Finkelstein |
| 5,601,200 A | 2/1997 | Finkelstein |
| 5,628,453 A | 5/1997 | MacLaughlin |
| 5,688,572 A | 11/1997 | Slat |
| 5,857,572 A | 1/1999 | Bird |
| 5,916,926 A | 6/1999 | Cooper |
| 5,927,525 A | 7/1999 | Darr |
| 5,952,423 A | 9/1999 | Shang |
| 6,001,439 A | 12/1999 | Kawakami |
| 6,053,214 A | 4/2000 | Sjoberg et al. |
| 6,221,925 B1 | 4/2001 | Constant |
| 6,284,810 B1 | 9/2001 | Burnham |
| 6,323,251 B1 | 11/2001 | Perez |
| 6,432,525 B1 | 8/2002 | Gokuraku |
| 6,444,149 B1 | 9/2002 | Valentinsson |
| 6,593,384 B2 | 7/2003 | Anderson |
| 6,616,434 B1 | 9/2003 | Burnham |
| 6,706,223 B1 | 3/2004 | Anderson |
| 6,811,843 B2 | 11/2004 | DeBraal |
| 6,875,484 B1 | 4/2005 | Kogure |
| 6,921,571 B2 | 7/2005 | Funakoshi |
| 6,986,922 B2 | 1/2006 | Hesse |
| 7,014,801 B2 | 3/2006 | Imanari |
| 7,169,338 B2 | 1/2007 | Imanari |
| 7,462,307 B2 | 12/2008 | Hesse |
| 7,588,808 B2 | 9/2009 | Hutchinson |
| 7,588,810 B2 | 9/2009 | Semersky |
| 7,704,440 B2 | 4/2010 | Brandner |
| 7,759,267 B2 | 7/2010 | Conover |
| 7,871,558 B2 | 1/2011 | Merical |
| 7,973,100 B2 | 7/2011 | Wada |
| 8,061,540 B2 | 11/2011 | Toyoda |
| 8,061,541 B2 | 11/2011 | Trumpp |
| 8,124,203 B2 | 2/2012 | Semersky |
| 8,137,600 B2 | 3/2012 | Pierick |
| 8,263,198 B2 | 9/2012 | Carvell |
| 8,342,420 B2 | 1/2013 | Roberts, Jr. |
| 8,397,932 B2 | 3/2013 | Ichikawa |
| 8,414,823 B2 | 4/2013 | Rudiger |
| 8,435,615 B2 | 5/2013 | Tsuchida |
| 8,535,598 B2 | 9/2013 | Imanari |
| 2001/0048988 A1 | 12/2001 | Forte |
| 2002/0006975 A1 | 1/2002 | Welsh |
| 2003/0021927 A1 | 1/2003 | Boenig |
| 2003/0065097 A1 | 4/2003 | DeGroot |
| 2003/0127765 A1 | 7/2003 | Weiland |
| 2004/0062885 A1 | 4/2004 | Imanari |
| 2004/0086703 A1* | 5/2004 | Semersky ............... B32B 1/02 428/319.3 |
| 2006/0091576 A1 | 5/2006 | Takase |
| 2006/0142495 A1 | 6/2006 | Lalho |
| 2006/0205833 A1 | 9/2006 | Martinez |
| 2006/0255049 A1 | 11/2006 | McCarthy |
| 2007/0013110 A1 | 1/2007 | Safian |
| 2008/0125547 A1 | 5/2008 | Swogger |
| 2008/0185301 A1 | 8/2008 | Merical |
| 2008/0246193 A1 | 10/2008 | Smits |
| 2008/0261016 A1 | 10/2008 | Tamada |
| 2009/0269566 A1 | 10/2009 | Eichbauer |
| 2010/0196641 A1 | 8/2010 | Devos |
| 2010/0215879 A1 | 8/2010 | Dooley |
| 2010/0227092 A1 | 9/2010 | Semersky |
| 2010/0282759 A1 | 11/2010 | Eckhardt |
| 2011/0172363 A1 | 7/2011 | Share |
| 2011/0180509 A1 | 7/2011 | Hutchinson |
| 2011/0250384 A1 | 10/2011 | Sumi |
| 2012/0024459 A1 | 2/2012 | Igarashi |
| 2012/0061886 A1 | 3/2012 | Sumi |
| 2012/0076965 A1 | 3/2012 | Silvers |
| 2012/0103858 A1 | 5/2012 | Schmidt |
| 2012/0318805 A1 | 12/2012 | Leser |
| 2012/0318859 A1 | 12/2012 | Leser |
| 2013/0026128 A1 | 1/2013 | Beck |
| 2013/0032963 A1 | 2/2013 | Tokiwa |
| 2013/0052385 A1* | 2/2013 | Leser ............... C08J 9/0023 428/36.92 |
| 2013/0059102 A1 | 3/2013 | Torchio |
| 2013/0085244 A1 | 4/2013 | Zhao |
| 2013/0143975 A1 | 6/2013 | Cassidy |
| 2014/0037880 A1 | 2/2014 | Siddhamalli |
| 2015/0014879 A1 | 1/2015 | Sun |
| 2015/0061194 A1 | 3/2015 | Sun |
| 2016/0089852 A1 | 3/2016 | Lindenfelzer |

FOREIGN PATENT DOCUMENTS

| | | |
|---|---|---|
| CN | 1984763 | 6/2007 |
| CN | 102313084 | 1/2012 |
| CN | 102762350 | 10/2012 |
| EP | 1057608 | 4/2002 |
| EP | 1472087 | 4/2006 |
| EP | 1741744 | 1/2007 |
| EP | 0851805 | 12/2008 |
| EP | 1040158 | 4/2012 |
| EP | 1749635 | 9/2012 |
| EP | 2323829 | 10/2012 |
| EP | 2141000 | 2/2014 |
| JP | 04278340 | 10/1992 |
| JP | 4278340 | 10/1992 |
| JP | 2004137377 | 5/2004 |
| JP | 2012526006 | 10/2012 |
| JP | 2013203886 | 10/2013 |
| WO | 2003066320 | 8/2003 |
| WO | 2010015673 | 2/2010 |
| WO | 2010151724 | 12/2010 |
| WO | 2012174567 | 12/2012 |
| WO | 2012174568 | 12/2012 |
| WO | 2013032552 | 3/2013 |
| WO | 2014099335 | 6/2014 |
| WO | 2015024018 | 2/2015 |

OTHER PUBLICATIONS

Office Action dated Aug. 15, 2016 for U.S. Appl. No. 14/468,789.
International Search Report and Written Opinion, International

(56) References Cited

OTHER PUBLICATIONS

Application No. PCT/US2016/020844, search completed Apr. 14, 2016.
International Search Report and Written Opinion, International Application No. PCT/US2016/020674, search completed Apr. 18, 2016.
Office Action dated Jun. 15, 2016 for U.S. Appl. No. 14/787,901.
International (PCT) Search Report for PCT/US16/20871, 20 pages.
Cheng et al., "Improving processability of polyethylenes by radiation-induced long chain branching," Radiation Physics and Chemistry 79 (2009) 563-566.
International Search Report dated Nov. 2, 2014, relating to International Application No. PCT/US2014/53666.
English summary of Russian Office Action for Russian Patent Application Serial No. 2016104363, dated Jul. 5, 2016, 3 pages.
Chinese Office Action for Application Serial No. 201480021009.9, dated Jul. 5, 2016 including English language summary, 17 pages.
International Preliminary Report on Patentability dated Mar. 1, 2016, relating to International Application No. PCT/US2014/053666.
International Preliminary Report on Patentability dated Mar. 1, 2016, relating to International Application No. PCT/US2014/053665.
International Preliminary Report on Patentability, dated Mar. 1, 2016, relating to International Application No. PCT/US2014/052606.
International Preliminary Report on Patentability, dated Mar. 1, 2016, relating to International Application No. PCT/US2014/053667.
International Search Report and Written Opinion related to International Application No. PCT/US2014/053666 dated Oct. 29, 2014.
International Search Report and Written Opinion dated Jul. 18, 2014, relating to International Application No. PCT/US2014/027551.
Australian Patent Examination Report for Australian App. No. 2014239318 dated Nov. 25, 2016, 4 pages.
Chinese Office Action for Chinese App. No. 201480047976.2 dated Dec. 9, 2016, 11 pages.
Typical Engineering Properties of Polypropylene information sheet, Ineos Olefins and Polymers USA, archived at https://web.archive.org/web/20160501000000*/http://www.ineos.com/globalassets/ineos-group/businesses/ineos-olefins-and-polymers-usa/products/technical-information-patents/ineos-engineering-properties-of-pp.pdf, Mar. 2016, p. 1.
Office Action dated Dec. 14, 2016 for U.S. Appl. No. 14/211,553.
Chinese Office Action for Chinese App. No. 201480047578.0 dated Nov. 30, 2016, 10 pages.
U.S. Office Action dated Sep. 15, 2016 for U.S. Appl. No. 15/239,894, 8 pages.
Office Action dated May 11, 2015 for U.S. Appl. No. 14/331,066.
International Search Report and Written Opinion dated Jan. 21, 2015, relating to International Application No. PCT/US2014/053665.
International Search Report and Written Opinion dated Jan. 27, 2015, relating to International Application No. PCT/US2014/53667.
International Search Report dated Nov. 24, 2014, relating to International Application No. PCT/US2014/52606.
Unilever Launches Breakthrough Packaging Technology That Uses 15% Less Plastic, Unilever (Apr. 24, 2014), http://www.unilever.com/mediacentre/pressreleases/2014/Unileverlaunchesbreakthroughpackagingtechnologythatuses15lessplastic.aspx (2 pages).
Unilever Says It Will Use Less Plastic Per Bottle, Yahoo News (Apr. 22, 2014, 10:20 AM), http://news.yahoo.com/unilever-says-less-plastic-per-bottle-142039401--finance.html (3 pages).
Office Action dated Mar. 14, 2017 for U.S. Appl. No. 14/475.266.
Office Action dated Mar. 21, 2017 for U.S. Appl. No. 14/475,411.
Extended European Search Report for European App. No. 14840353.8 dated Mar. 17, 2017, 6 pages.
Australian Examination Report for Australian App. No. 2014286957 dated May 2, 2017, 3 pages.
Taiwan Search Report for Taiwan Application No. 103109790 dated Apr. 20, 2017, 9 pages.
New Zealand Examination Report for New Zealand Patent App. No. 712687 dated Mar. 30, 2017, 10 pages.
Extended European Search Report for European App. No. 14840734.9 dated Apr. 4, 2017, 10 pages.
Extended European Search Report for European App. No. 14838960.4 dated Mar. 17, 2017, 9 pages.
Extended European Search Report for European App. No. 14840262 dated Mar. 23, 2017, 8 pages.
Office Action dated Apr. 21, 2017 for U.S. Appl. No. 14/475,411.

* cited by examiner

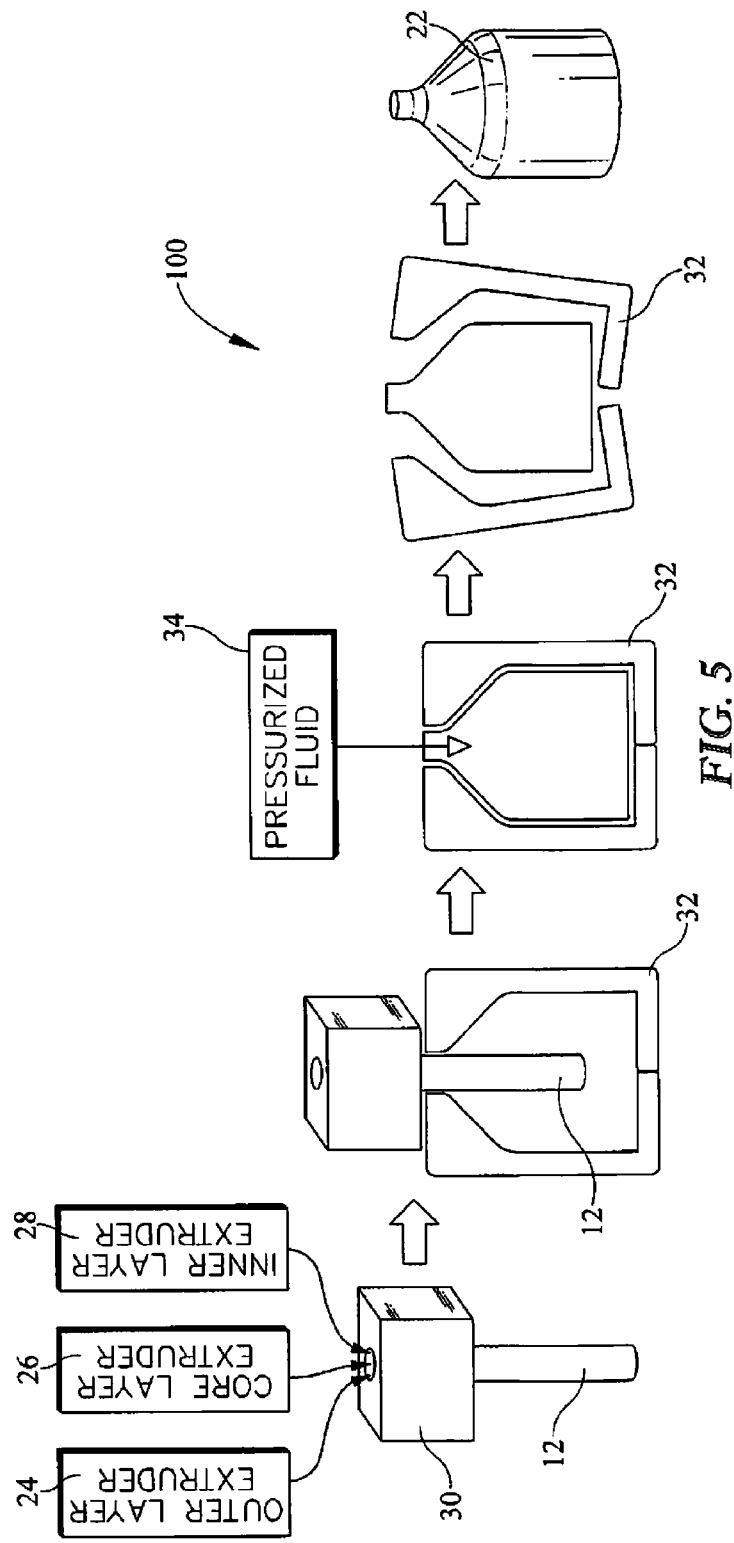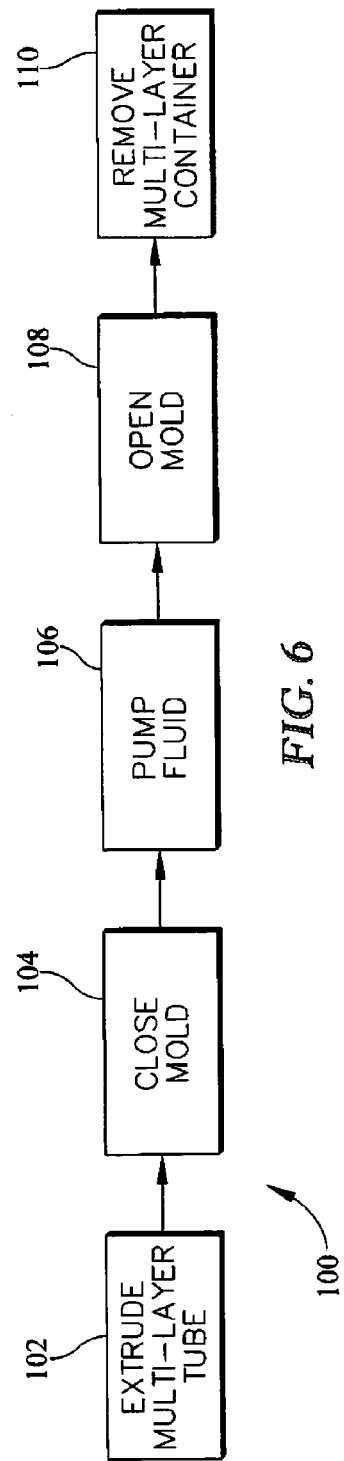

US 9,808,983 B2

POLYMERIC MATERIAL FOR CONTAINER

PRIORITY CLAIM

This application claims priority under 35 U.S.C. §119(e) to U.S. Provisional Application Ser. No. 61/872,260, filed Aug. 30, 2013, U.S. Provisional Application Ser. No. 61/872,368, filed Aug. 30, 2013, and U.S. Provisional Application Ser. No. 61/872,183, filed Aug. 30, 2013, each of which is expressly incorporated by reference herein.

BACKGROUND

The present disclosure relates to containers, and in particular to containers made from polymeric materials. More particularly, the present disclosure relates containers made using a blow-molding process.

SUMMARY

According to the present disclosure, parisons can be formed from polymeric materials. The parisons can be expanded using a blow molding process to make a container.

In illustrative embodiments, a parison includes an inner layer, an outer layer, and a core layer made from insulative cellular non-aromatic polymeric material. The parison is then expanded using a blow molding process to make a multi-layer container including associated layers, namely, an inner layer, an outer layer and a compressed core layer. In illustrative embodiments, a density of the multi-layer container can vary from a density of the parison by about 20% or less.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 5 is an illustrative and diagrammatic view of a container-manufacturing process in accordance with the present disclosure used to form the multi-layer container of FIG. 3;

FIG. 6 is a diagrammatic view of the container-manufacturing process of FIG. 5 showing the various steps included the container-manufacturing process used to form an exemplary multi-layer container.

DETAILED DESCRIPTION OF THE DRAWINGS

Figure 1:
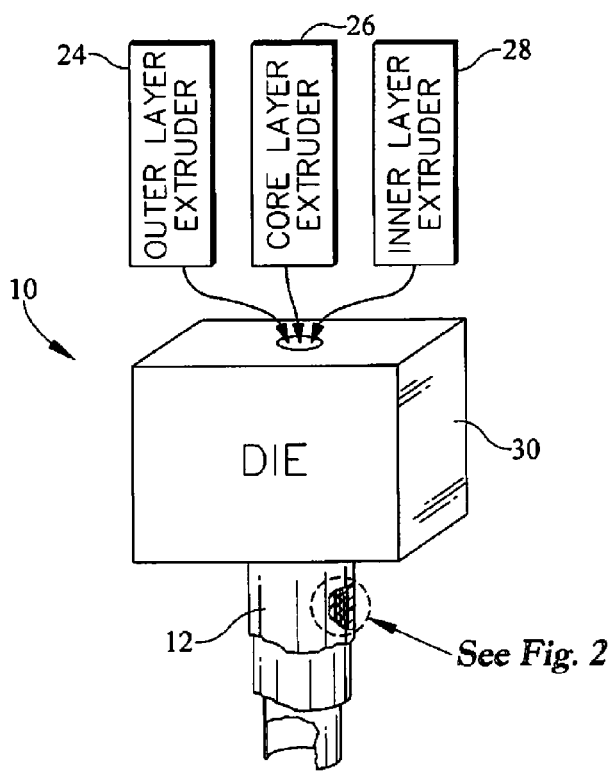
FIG. 1 is a diagrammatic view of an exemplary apparatus for forming an exemplary parison showing that the exemplary parison includes an outer layer, a core layer, and an inner layer and that the apparatus comprises an outer layer extruder, a core layer extruder, an inner layer extruder, and a co-extrusion die.

A multi-layer container 22 in accordance with the present disclosure is manufactured from a multi-layer parison 12 during a container-manufacturing process 100 as shown in FIGS. 5 and 6. Multi-layer parison 12 includes an inner layer 14, a core layer 16, and an outer layer 18. Inner layer 14 and outer layer 18 may be made from polymeric materials. Core layer 16 is made, for example, from an insulative cellular non-aromatic polymeric material including cells 20 filled with gas. The inclusion of cells 20 in multi-layer parison 12 provides for a lower core material density and a lower overall parison density than would be achieved absent cells 20.

Multi-layer parison 12 may be transformed into multi-layer container 22 having an inner layer 14, a core layer 16, and an outer layer 18 during an illustrative container-manufacturing process 100. In the course of transforming multi-layer parison 12 into multi-layer container 22, some cells 20 included in core layer 16 of multi-layer tube 12 (also called multi-layer parison 12) may collapse or burst, resulting in core layer 16 of multi-layer container 22 having a greater density than core layer of multi-layer parison 12 and multi-layer container 22 as a whole having a greater density than multi-layer parison 12. A ratio of container density to parison density in a range of about 1.0 to about 1.2 may be established. Cell collapse and damage in the core layer of multi-layer container 22 may be minimized when the ratio of container density to parison density is in the range of about 1.0 to about 1.2.

Figure 2:
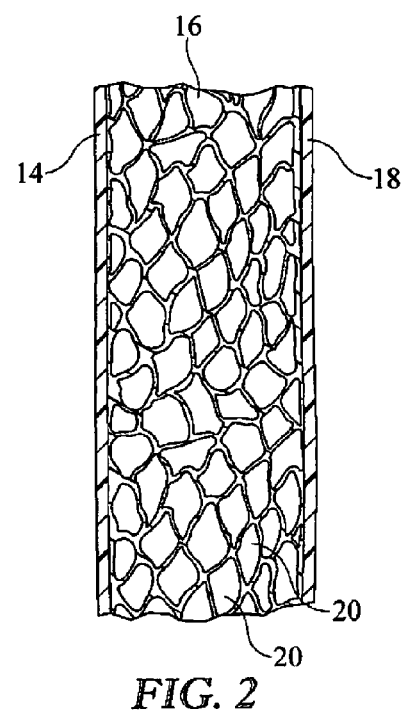
FIG. 2 is an enlarged partial elevation view of the circled region of FIG. 1 showing that the exemplary parison includes the outer layer, the core layer including plurality of expanded cells, and the inner material layer.

An exemplary apparatus 10 for forming multi-layer parison 12, as well as an exemplary multi-layer parison 12 formed thereby is shown in FIG. 1. Multi-layer parison 12 has three material layers, namely, inner layer 14, core layer, and an outer layer. A portion of sidewall of multi-layer parison 12 including inner layer 14, core layer 16, and outer layer 18, wherein core layer 16 is located between inner layer 14 and outer layer 18 is shown in FIG. 2.

Apparatus 10 includes an inner layer extruder 24, a core layer extruder 26, an outer layer extruder 28, and a co-extrusion die 30 is shown, for example, in FIG. 1. Each of extruders 24, 26, 28 is configured to receive raw material used in forming corresponding layers 14, 16, 18 and to process the raw material for extrusion through co-extrusion die 30 to produce multi-layer parison 12.

For example, each of extruders 24, 26, 28 may receive raw polymeric or other base material in pellet or other suitable form. Each of extruders 24, 26, 28 may also receive additives in a suitable form. Such additives may be used as colorants, lubricants, nucleating agents, blowing agents, and the like. Each of extruders 24, 26, 28 may be configured with heaters to melt the base material and any additive provided thereto and mixers to mix the molten base material with any such additives. The molten base material, along with any additive mixed or dissolved therein, may be provided under pressure to co-extrusion die 30 and forced there through, thereby forming multi-layer parison 12. Reference is hereby made to U.S. application Ser. No. 14/331,066, filed Jul. 14, 2014 and titled POLYMERIC MATERIAL FOR CONTAINER for disclosure relating to possible material formulations. Reference is hereby made to U.S. Provisional Application Ser. No. 61/872,260, filed Aug. 30, 2013 and titled MULTI-LAYER TUBE AND PROCESS FOR MAKING THE SAME and U.S. application Ser. No. 14/475,411, filed Sep. 2, 2014 and titled MULTI-LAYER TUBE AND PROCESS FOR MAKING THE SAME for disclosure relating to operation of extruders 24, 26, 28 and co-extrusion die to make multi-layer parison 12.

Multi-layer parison 12 is described herein as having three layers, and apparatus 10 is described herein as being configured to make a three-layer parison. Other exemplary parisons could have further material layers, and other exemplary apparatus could be configured for forming the further material layers of such parisons. For example, other exemplary multi-layer parisons could have one or more of an oxygen barrier layer, an oxygen scavenging layer, a UV barrier layer, a tie layer, and/or structural layers in addition to inner layer 14, core layer 16, and outer layer 18.

As discussed above, exemplary multi-layer parison 12 includes inner layer 14, core layer 16 and outer layer 18. In an exemplary embodiment, inner layer 14 and outer layer 18 are formed of a polypropylene material. In other exemplary embodiments, inner layer 14 and outer layer 18 may be formed of other materials, for example, other polymeric materials Inner layer 14 and outer layer 18 may be formed of like material or different materials.

In an exemplary embodiment, core layer 16 is formed of an insulative cellular non-aromatic polymeric material including cells 20 of gas entrained within a layer of base material, for example, a polyethylene base material. Cells 20 may provide insulating properties to and/or reduce the density of multi-layer parison 12 and/or a multi-layer container formed therefrom. The insulative cellular non-aromatic polymeric material may be formed by mixing a nucleating agent, for example, talc, into a polymeric base material and injecting a blowing agent, for example, nitrogen or carbon dioxide gas, into the polymeric base material and nucleating agent mixture under pressure so that the blowing agent dissolves in the base material. The blowing agent may be injected into the base material and nucleating agent mixture under pressure in a barrel portion of core layer extruder 26. Once the pressure is released, for example, when the material exits co-extrusion die 30, the blowing agent comes out of solution and expands about nucleation sites provided by the nucleating agent, thereby forming cells 20 in core layer 16.

Figure 3:
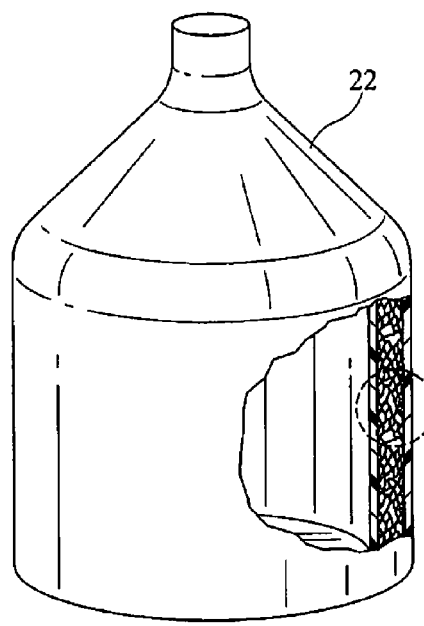
FIG. 3 is a perspective view of a multi-layer container formed using a container-manufacturing process from the exemplary parison shown in FIG. 2.
Figure 4:
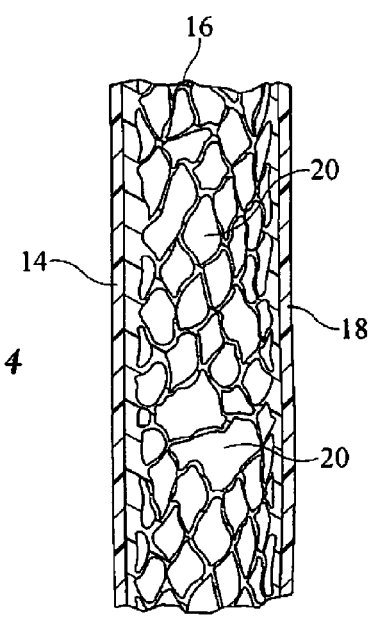
FIG. 4 is an enlarged partial elevation view of the circled region of FIG. 3 showing that the multi-layer container includes the outer layer, a compressed core layer, and the inner layer.

Multi-layer parison 12 may be formed into an exemplary multi-layer container 22, as illustrated in FIG. 3, using container-manufacturing process 100. As shown in FIGS. 5 and 6, container-manufacturing process 100 may involve at step 102 forming multi-layer parison 12, at step 104 placing a warm multi-layer parison 12 formed by apparatus 10 into a blow mold 32 and closing mold 32, at step 106 pressurizing the interior region of multi-layer parison 12 with a pressurized fluid 34, thereby causing multi-layer parison 12 to expand to the form of a multi-layer container 22 having a form corresponding to the form of the interior of the blow mold, at step 108 allowing multi-layer container 22 to cool at least partially and then opening blow mold 32, and at step 110 removing multi-layer container 22 from blow mold 32. As suggested above and as illustrated in FIG. 4, multi-layer container 22 thus formed includes a wall having three layers corresponding to the three layers of multi-layer parison 12, namely, inner layer 14, core layer 16, and outer layer 18. Reference is hereby made to U.S. Provisional Application Ser. No. 61/872,183, filed Aug. 30, 2013 and titled CONTAINER AND PROCESS FOR MAKING THE SAME and U.S. application Ser. No. 14/475,266, filed Sep. 2, 2014 and titled CONTAINER AND PROCESS FOR MAKING THE SAME for disclosure relating to a container-manufacturing process.

During the blow-molding process, the pressure applied to multi-layer parison 12 by the pressurized fluid may compress cells 20. As cells 20 are compressed, the density of the insulative cellular non-aromatic polymeric material comprising core layer 16 of multi-layer parison 12 increases as it is transformed into core layer 16 of multi-layer container 22. If multi-layer container 22 is allowed to cool to a point where the base material/resin comprising core layer 16 achieves a generally rigid state, cells 20 will not be able to re-expand after the pressure applied by the pressurizing fluid is relieved. Under these circumstances, it follows that the density of core layer 16 of multi-layer container 22 will be greater than the density of core layer 16 of multi-layer parison 12, and the density of multi-layer container 22 as a whole will be greater than the density of and multi-layer parison 12 as a whole.

Pressure applied to multi-layer parison 12 by the pressurized fluid during the blow molding operation may cause one or more of cells 20 to burst or collapse. Cells 20 may burst or collapse as a result of the blow molding operation or for other reasons. A build-up of base material comprising core layer 16 may accumulate against inner layer 14 and outer layer 18 as a result of cells bursting as illustrated in FIG. 4. Such bursting of cells also could result in the density of core layer 16 of multi-layer container 22 being greater than the density of core layer 16 of multi-layer parison 12 and the density of multi-layer container 22 as a whole being greater than the density of multi-layer parison 12 as a whole.

The increase in density of core layer 16 of multi-layer container 22 compared to core layer 16 of multi-layer parison 12 may be controlled by selection of materials comprising core layer 16 of multi-layer parison 12 and parameters of container-manufacturing process 100. In an exemplary embodiment, the density of core layer 16 of multi-layer parison 12 varies from the density of core layer 16 of multi-layer container 22 made therefrom by no more than about 20%. In other embodiments, the density of core layer 16 of multi-layer parison 12 varies from the density of core layer 16 of multi-layer container 22 made therefrom by no more than about 19% or 18% or 17% or 16% or 15% or 14% or 13% or 12% or 11% or 10% or 9% or 8% or 7% or 6% or 5% or 4% or 3% or 2% or 1%.

Core layer extruder 26 uses a core-layer formulation to produce core layer 16. In one example, the core-layer formulation comprises a polyethylene base resin and one or more cell-forming agents. In core layer extruder 26, the core layer formulation is heated and a cell-forming agent is introduced into the molten formulation prior to extrusion of the materials from the core layer extruder 26. As the core layer formulation exits the extruder, cells 20 nucleate in the molten material and the material expands to form core layer 16 made of insulative cellular non-aromatic polymeric material.

In one exemplary embodiment, a formulation used to produce the insulative cellular non-aromatic polymeric material includes at least one polymeric material. The polymeric material may include one or more base resins. In one example, the base resin is High Density Polyethylene (HDPE). In another example, the base resin is a unimodal HDPE. In yet another example, the base resin is unimodal, high-melt strength HDPE. In still yet another example, the base resin is unimodal, high-melt strength HDPE such as DOW® DOWLEX™ IP 41 HDPE (available from The Dow Chemical Company) that has been electron beam modified to provide long chain branching and a melt index of about 0.25 g/10 min. Another example of a unimodal, high-melt strength HDPE is EQUISTAR® ALATHON® H5520 HDPE copolymer (available from Lyondell Chemical Company) which has been electron beam modified to have long-chain branching and a melt index of about 0.25 g/10 min. Another example of a suitable unimodal HDPE is FORMOLENE® HB5502F HDPE hexene copolymer (available from Formosa Plastics Corporation).

In certain exemplary embodiments, the formulation may include two base resins that are HDPE. One illustrative example of the formulation includes a first base resin of FORMOLENE® HB5502F HDPE hexene copolymer (available from Formosa Plastics Corporation) and a second base resin of EQUISTAR® ALATHON® H5520 HDPE copolymer (available from Lyondell Chemical Company). In embodiments with more than one HDPE copolymer, different HDPE copolymers can be used depending on the attributes desired in the formulation. For example, a formulation may include both e-beam modified EQUISTAR® ALATHON® H5520 and FORMOLENE® HB5502F HDPE. In such an embodiment the EQUISTAR® ALATHON® H5520 provides higher melt strength which increases foaming potential, and has less flexural modulus or brittleness. The FORMOLENE® HB5502F HDPE provides wide unimodal polydispersity index or distribution and maximizes economic advantage.

In another example, a formulation includes about 50% e-beam modified EQUISTAR® ALATHON® H5520 and about 50% FORMOLENE® HB5502F HDPE. Together the combination provides a film having drop resistance capability associated with a non-modified HDPE resin and increased melt strength of an e-beam modified long-chain branched HDPE. Depending on the desired characteristics, the percentage of two HDPE copolymers may be varied, e.g., 25%/75%, 30%/70%, 35%/65%, 40%/60%, 45%/55%, 50%/50%, etc. In an embodiment, a formulation includes three HDPE copolymers in the base resin. Again, depending on the desired characteristics, the percentage of three HDPE copolymers can be varied, 33%/33%/33%, 30%/30%/40%, 25%/25%/50%, etc.

A core-layer formulation can include one or more base resins. The amount of HDPE base resin may be one of several different values or fall within one of several different ranges. It is within the scope of the present disclosure to select an amount of HDPE base resin and be one of the following values: about 85%, 90%, 95%, 97%, 98%, 99%, 99.5%, and 99.9% of the total formulation by weight percentage. It is within the scope of the present disclosure for the amount of HDPE base resin in the formulation to fall within one of many different ranges. In a first set of ranges, the range of HDPE base resin is one of the following ranges: about 85% to 99.9%, 86% to 99.9%, 87% to 99.9%, 87.5% to 99.9%, 88% to 99.9%, 89% to 99.9%, 90% to 99.9%, 91% to 99.9%, 92% to 99.9%, 93% to 99.9%, 94% to 99.9%, 95% to 99.9%, 96% to 99.9%, 96.5% to 99.9%, 97% to 99.9%, and 98% to 99.9% of the total formulation by weight percentage. In a second set of ranges, the range of HDPE base resin is one of the following ranges: about 85% to 99.5%, 85% to 99%, 85% to 98%, 85% to 97%, 85% to 96%, 85% to 96.5%, 85% to 95%, 85% to 94%, 85% to 93%, 85% to 92%, 85% to 91%, 85% to 90%, 85% to 89%, 85% to 88%, 85% to 87%, and 85% to 86% of the total formulation by weight percentage. In a third set of ranges, the range of HDPE base resin is one of the following ranges: about 87.5% to 96.5%, 87.5% to 96%, 87.5% to 95.5%, 87.5% to 95%, 95% to 99%, 95.5% to 99%, 96% to 99%, and 96.5% to 99% of the total formulation by weight percentage. Each of these values and ranges is embodied in the Examples.

Long chain branching refers to the presence of polymer side chains (branches) that have a length that is comparable or greater than a length of the backbone to which the polymer side chains are coupled to. Long chain branching creates viscoelastic chain entanglements (polymer entanglements) that hamper flow during extensional or oriented stretching and provide for a strain hardening phenomenon. The strain hardening phenomenon may be observed through two analytical methods.

The first analytical method used to observe the presence of strain hardening on an extensional rheometer. During extensional or oriented flow on an extensional rheometer, strain hardening will occur when polymer entanglements do not allow the polymer to flow under Linear Viscoelastic (LVE) conditions. As a result, these polymer entanglements hamper flow and create a deviation from the LVE conditions as observed as a hook formation. The strain hardening phenomenon becomes more severe as strain and strain rate increase due to faster and more severe polymer chain entanglement motion. Virgin polymers without long chain branching will exhibit LVE flow characteristics. In comparison, long chain branched polymers will exhibit strain hardening and which causes a deviation from the LVE flow characteristics of the virgin polymer providing the hook formation under the same test conditions.

The second analytical method used to observe the presence of long chain branching is evaluating melt strength data as tested per ISO 16790 which is incorporated by reference herein in its entirety. An amount of melt strength is known to be directly related to the presence of long chain branching when compared to similar virgin polymers lacking long chain branching. By way of example, Borealis DAPLOY™ WB140HMS Polypropylene (PP) (available from Borealis AG) is compared to other polymers having similar molecular weight, polydispersity index, and other physical characteristics. The DAPLOY™ WB140HMS PP has a melt strength which exceeds about 36 centi-newtons while other similar PP resins lacking long chain branching have a melt strength of less than about 10 centi-newtons.

The formulation used to produce the insulative cellular non-aromatic polymeric material may further include one or more cell-forming agents. Cell-forming agents include nucleating agents and blowing agents. A nucleating agent is used to provide and control nucleation sites within a molten formulation to promote formation of cells, bubbles, or voids in the molten formulation during extrusion. A blowing agent is used to grow cells in the molten material at nucleation sites. Blowing agents may be used alone in the formulation or with nucleating agents.

Nucleating agent means a chemical or physical material that provides sites for cells to form in a molten formulation mixture. Nucleating agents may include chemical nucleating agents and physical nucleating agents. The nucleating agent may be blended with the formulation that is introduced into the hopper of the extruder. Alternatively, the nucleating agent may be added to the molten resin mixture in the extruder.

Suitable physical nucleating agents have desirable particle size, aspect ratio, and top-cut properties. Examples include, but are not limited to, talc, $CaCO_3$, mica, and mixtures of at least two of the foregoing. One representative example is Heritage Plastics HT6000 Linear Low Density Polyethylene (LLDPE) Based Talc Concentrate.

A core-layer formulation can include a physical nucleating agent. The amount of a physical nucleating agent may be one of several different values or fall within one of several different ranges. It is within the scope of the present disclosure to select an amount of a physical nucleating agent and be one of the following values: about 0%, 0.1%, 0.25%, 0.5%, 0.75%, 1.0%, 1.25%, 1.5%, 1.75%, 2%, 2.25%, 2.5%, 3%, 4%, 5%, 6%, and 7% of the total formulation by weight percentage. It is within the scope of the present disclosure for the amount of a physical nucleating agent in the formulation to fall within one of many different ranges. In a first set of ranges, the range of a physical nucleating agent is one of the following ranges: about 0% to 7%, 0.1% to 7%, 0.25% to 7%, 0.5% to 7%, 0.75% to 7%, 1% to 7%, 1.25% to 7%, about 1.5% to 7%, 1.75% to 7%, 2.0% to 7%, 2.25% to 7%, 2.5% to 7%, 3% to 7%, 4% to 7%, 5% to 7%, and 6% to 7% of the total formulation by weight percentage. In a second set of ranges, the range of a physical nucleating agent is one of the following ranges: about 0% to 6%, 0% to 5%, 0% to 4%, 0% to 3%, 0% to 2.5%, 0% to 2.25%, 0% to 2%, 0% to 1.75%, 0% to 1.5%, 0% to 1.25%, 0% to 1%, 0% to 0.75%, and 0% to 0.5% of the total formulation by weight percentage. In a third set of ranges, the range of a physical nucleating agent is one of the following ranges: about 0.1% to 6%, 0.1% to 5%, 0.1% to 4%, 0.1% to 3.5%, 0.1% to 3%, 0.1% to 2.5%, 0.1% to 2.25%, 0.1% to 2%, 0.1% to 1.75%, 0.1% to 1.5%, 0.1% to 1.25%, 0.1% to 1%, 0.1% to 0.75%, and 0.1% to 0.5% of the total formulation by weight percentage. Each of these values and ranges is embodied in the Examples. In an embodiment, the formulation lacks talc.

Suitable chemical nucleating agents decompose to create cells in the molten formulation when a chemical reaction temperature is reached. These small cells act as nucleation sites for larger cell growth from a physical or other type of blowing agent. In one example, the chemical nucleating agent is citric acid or a citric acid-based material. One representative example is HYDROCEROL™ CF-40E (available from Clariant Corporation), which contains citric acid and a crystal nucleating agent.

A core-layer formulation can include a nucleating agent. The amount of a nucleating agent may be one of several different values or fall within one of several different ranges. It is within the scope of the present disclosure to select an amount of a nucleating agent and be one of the following values: about 0.1%, 0.25%, 0.5%, 0.75%, 1%, 1.5%, 2%, 2.5%, 3%, 3.5%, 4%, 5%, 10%, and 15% of the total formulation by weight percentage. It is within the scope of the present disclosure for the amount of a nucleating agent in the formulation to fall within one of many different ranges. In a first set of ranges, the range of a nucleating agent is one of the following ranges: about 0.1% to 15%, 0.25% to 15%, 0.5% to 15%, 1% to 15%, 1.5% to 15%, 2% to 15%, 2.5% to 15%, 3% to 15%, 3.5% to 15%, 4% to 15%, 4.5% to 15%, and 5% to 15% of the total formulation by weight percentage. In a second set of ranges, the range of a nucleating agent is one of the following ranges: about 0.1% to 10%, 0.25% to 10%, 0.5% to 10%, 0.75% to 10%, 1% to 10%, 1.5% to 10%, 2% to 10%, 2.5% to 10%, 3% to 10%, 3.5% to 10%, 4% to 10%, 4.5% to 10%, and 5% to 10% of the total formulation by weight percentage. In a third set of ranges, the range of a nucleating agent is one of the following ranges: about 0.1% to 5%, 0.25% to 5%, 0.5% to 5%, 0.75% to 5%, 1% to 5%, 1.5% to 5%, 2% to 5%, 2.5% to 5%, 3% to 5%, 3.5% to 5%, 4% to 5%, and 4.5% to 5% of the total formulation by weight percentage. Each of these values and ranges is embodied in the Examples.

A blowing agent refers to a physical or a chemical material (or combination of materials) that acts to expand nucleation sites. Blowing agents may include only chemical blowing agents, only physical blowing agents, combinations thereof, or several types of chemical and physical blowing agents. The blowing agent acts to reduce density by forming cells in the molten formulation at the nucleation sites. The blowing agent may be added to the molten resin mixture in the extruder.

Chemical blowing agents are materials that degrade or react to produce a gas. Chemical blowing agents may be endothermic or exothermic. Chemical blowing agents typically degrade at a certain temperature to decompose and release gas. One example of a chemical blowing agent is citric acid or citric-based material. One representative example is HYDROCEROL™ CF-40E (available from Clariant Corporation), which contains citric acid and a crystal nucleating agent. Here, the citric acid decomposes at the appropriate temperature in the molten formulation and forms a gas which migrates toward the nucleation sites and grows cells in the molten formulation. If sufficient chemical blowing agent is present, the chemical blowing agent may act as both the nucleating agent and the blowing agent.

In another example, chemical blowing agents may be selected from the group consisting of azodicarbonamide; azodiisobutyro-nitrile; benzenesulfonhydrazide; 4,4-oxybenzene sulfonylsemicarbazide; p-toluene sulfonyl semicarbazide; barium azodicarboxylate; N,N'-dimethyl-N,N'-dinitrosoterephthalamide; trihydrazino triazine; methane; ethane; propane; n-butane; isobutane; n-pentane; isopentane; neopentane; methyl fluoride; perfluoromethane; ethyl fluoride; 1,1-difluoroethane; 1,1,1-trifluoroethane; 1,1,1,2-tetrafluoro-ethane; pentafluoroethane; perfluoroethane; 2,2-difluoropropane; 1,1,1-trifluoropropane; perfluoropropane; perfluorobutane; perfluorocyclobutane; methyl chloride; methylene chloride; ethyl chloride; 1,1,1-trichloroethane; 1,1-dichloro-1-fluoroethane; 1-chloro-1,1-difluoroethane; 1,1-dichloro-2,2,2-trifluoroethane; 1-chloro-1,2,2,2-tetrafluoroethane; trichloromonofluoromethane; dichlorodifluoromethane; trichlorotrifluoroethane; dichlorotetrafluoroethane; chloroheptafluoropropane; dichlorohexafluoropropane; methanol; ethanol; n-propanol; isopropanol; sodium bicarbonate; sodium carbonate; ammonium bicarbonate; ammonium carbonate; ammonium nitrite; N,N'-dimethyl-N,N'-dinitrosoterephthalamide; N,N'-dinitrosopentamethylene tetramine; azodicarbonamide; azobisisobutylonitrile; azocyclohexylnitrile; azodiaminobenzene; bariumazodicarboxylate; benzene sulfonyl hydrazide; toluene sulfonyl hydrazide; p,p'-oxybis(benzene sulfonyl hydrazide); diphenyl sulfone-3,3'-disulfonyl hydrazide; calcium azide; 4,4'-diphenyl disulfonyl azide; p-toluene sulfonyl azide, and combinations thereof.

In one aspect of the present disclosure, where a chemical blowing agent is used, the chemical blowing agent may be introduced into the material formulation that is added to the hopper.

One example of a physical blowing agent is nitrogen ($N_2$). The $N_2$ is pumped into the molten formulation via a port in the extruder as a supercritical fluid. The molten material with the $N_2$ in suspension then exits the extruder via a die where a pressure drop occurs. As the pressure drop happens, $N_2$ moves out of suspension toward the nucleation sites where cells grow. Excess gas blows off after extrusion with the remaining gas trapped in the cells formed in the extrudate. Other suitable examples of physical blowing agents include, but are not limited to, carbon dioxide ($CO_2$), helium, argon, air, pentane, butane, or other alkane mixtures of the foregoing and the like. In an illustrative example, a physical blowing agent may be introduced at a rate of about 0.02 pounds per hour to about 1.3 pounds per hour. In another illustrative example, the physical blowing agent may be introduced at a rate of about 0.03 pounds per hour to about 1.25 pounds per hour. In another illustrative example, the physical blowing agent may be introduced at a rate of about 0.03 to about 0.15 pounds per hour. In still yet another illustrative example, the physical blowing agent may be introduced at a rate of about 0.05 pounds per hours to about 0.15 pounds per hour.

In one aspect of the present disclosure, at least one slip agent may be incorporated into the formulation to aid in increasing production rates. Slip agent (also known as a process aid) is a term used to describe a general class of materials which are added to the formulation and provide surface lubrication to the polymer during and after conversion. Slip agents may also reduce or eliminate die drool. Representative examples of slip agent materials include amides of fats or fatty acids, such as, but not limited to, erucamide and oleamide. In one exemplary aspect, amides from oleyl (single unsaturated C-18) through erucyl (C-22 single unsaturated) may be used. Other representative examples of slip agent materials include low molecular weight amides and fluoroelastomers. Combinations of two or more slip agents can be used. Slip agents may be provided in a master batch pellet form and blended with the resin formulation. One example of a suitable slip agent is Ampacet 102823 Process Aid PE MB LLDPE.

A core-layer formulation can include a slip agent. The amount of a slip agent may be one of several different values or fall within one of several different ranges. It is within the scope of the present disclosure to select an amount of a slip agent and be one of the following values: about 0%, 0.1%, 0.25%, 0.5%, 0.75%, 1%, 1.25%, 1.5%, 1.75%, 2%, 2.25%, 2.5%, and 3% of the total formulation by weight percentage. It is within the scope of the present disclosure for the amount of a slip agent in the formulation to fall within one of many different ranges. In a first set of ranges, the range of a slip agent is one of the following ranges: about 0% to 3%, 0.1% to 3%, 0.25% to 3%, 0.5% to 3%, 1% to 3%, 1.25% to 3%, 1.5% to 3%, 1.75% to 3%, 2% to 3%, 2.25% to 3%, and 2.5% to 3% of the total formulation by weight percentage. In a second set of ranges, the range of a slip agent is one of the following ranges: about 0% to 2.5%, 0% to 2%, 0% to 1.75%, 0% to 1.5%, 0% to 1.25%, 0% to 1%, 0% to 0.75%, 0% to 0.5%, and 0.1% to 2.5% of the total formulation by weight percentage. In a third set of ranges, the range of a slip agent is one of the following ranges: about 0.1% to 2.5%, 0.1% to 2%, 0.1% to 1.75%, 0.1% to 1.5%, 0.1% to 1.25%, 0.1% to 1%, 0.1% to 0.75%, and 0.1% to 0.5% of the total formulation by weight percentage. Each of these values and ranges is embodied in the Examples.

In another aspect of the present disclosure, an impact modifier may be incorporated into the formulation to minimize fracturing of the insulative cellular non-aromatic polymeric material when subjected to an impact such as a drop test. One representative example of a suitable impact modifier is DOW® AFFINITY™ PL 1880G polyolefin plastomer.

A core-layer formulation can include a colorant. The amount of a colorant may be one of several different values or fall within one of several different ranges. It is within the scope of the present disclosure to select an amount of a colorant and be one of the following values: about 0%, 0.1%, 0.25%, 0.5%, 0.75%, 1%, 1.25%, 1.5%, 1.75%, 2%, 2.25%, 2.5%, 3%, and 4% of the total formulation by weight percentage. It is within the scope of the present disclosure for the amount of a slip agent in the formulation to fall within one of many different ranges. In a first set of ranges, the range of a colorant is one of the following ranges: about 0% to 4%, 0.1% to 4%, 0.25% to 4%, 0.5% to 4%, 1% to 4%, 1.25% to 4%, 1.5% to 4%, 1.75% to 4%, 2% to 4%, 2.25% to 4%, 2.5% to 4%, and 3% to 4% of the total formulation by weight percentage. In a second set of ranges, the range of a colorant is one of the following ranges: about 0% to 3%, 0% to 2.5%, about 0% to 2.25%, 0% to 2%, 0% to 1.75%, 0% to 1.5%, 0% to 1.25%, 0% to 1%, 0% to 0.75%, and 0% to 0.5% of the total formulation by weight percentage. In a third set of ranges, the range of a slip agent is one of the following ranges: about 0.1% to 3.5%, 0.1% to 3.0%, 0.1% to 2.5%, 0.1% to 2.25%, 0.1% to 2%, 0.1% to 1.75%, 0.1% to 1.5%, 0.1% to 1.25%, 0.1% to 1%, 0.1% to 0.75%, and 0.1% to 0.5% of the total formulation by weight percentage. Each of these values and ranges is embodied in the Examples.

In an embodiment, the core layer 16 of insulative cellular non-aromatic polymeric material is located between and coupled to inner layer 14 and an outer layer 18 to produce multi-layer parison 12. The density may be one of several different values or fall within one of several different ranges. It is within the scope of the present disclosure to select a density and be one of the following values: about 0.4, 0.45, 0.5, 0.55, 0.6, 0.65, 0.7, 0.75, 0.8, 0.85, 0.9, and 1 g/cm³. It is within the scope of the present disclosure for the density of the formulation to fall within one of many different ranges. In a first set of ranges, the range of density is one of the following ranges: about 0.4 g/cm³ to 1 g/cm³, 0.45 g/cm³ to 1 g/cm³, 0.5 g/cm³ to 1 g/cm³, 0.55 g/cm³ to 1 g/cm³, 0.6 g/cm³ to 1 g/cm³, 0.65 g/cm³ to 1 g/cm³, 0.7 g/cm³ to 1 g/cm³, 0.75 g/cm³ to 1 g/cm³, 0.8 g/cm³ to 1 g/cm³, 0.85 g/cm³ to 1 g/cm³, and 0.9 g/cm³ to 1 g/cm³. In a second set of ranges, the range of density is one of the following ranges: about 0.4 g/cm³ to 0.95 g/cm³, 0.4 g/cm³ to 0.9 g/cm³, 0.4 g/cm³ to 0.85 g/cm³, 0.4 g/cm³ to 0.8 g/cm³, 0.4 g/cm³ to 0.75 g/cm³, 0.4 g/cm³ to 0.7 g/cm³, 0.4 g/cm³ to 0.65 g/cm³, 0.4 g/cm³ to 0.6 g/cm³, 0.4 g/cm³ to 0.55 g/cm³, 0.4 g/cm³ to 0.5 g/cm³, and 0.4 g/cm³ to 0.45 g/cm³. Density may be determined according to the density test procedure outlined in Example 5. Each of these values and ranges is embodied in the Examples.

In an embodiment, a multiple layer tube 10 includes a core layer 18 located between inner and outer layers 14, 16. It is within the scope of the present disclosure to select a density of a core layer and be one of the following values: about 0.4, 0.45, 0.5, 0.55, 0.6, 0.65, 0.7, 0.75, 0.8, 0.85, 0.9, and 1 g/cm³. It is within the scope of the present disclosure for the density of the core layer to fall within one of many different ranges. In a first set of ranges, the range of core layer density is one of the following ranges: about 0.4 g/cm³ to 1 g/cm³, 0.45 g/cm³ to 1 g/cm³, 0.5 g/cm³ to 1 g/cm³, 0.55 g/cm³ to 1 g/cm³, 0.6 g/cm³ to 1 g/cm³, 0.65 g/cm³ to 1 g/cm³, 0.7 g/cm³ to 1 g/cm³, 0.75 g/cm³ to 1 g/cm³, 0.8 g/cm³ to 1 g/cm³, 0.85 g/cm³ to 1 g/cm³, and 0.9 g/cm³ to 1 g/cm³. In a second set of ranges, the range of core-layer density is one of the following ranges: about 0.4 g/cm³ to 0.95 g/cm³, 0.4 g/cm³ to 0.9 g/cm³, 0.4 g/cm³ to 0.85 g/cm³, 0.4 g/cm³ to 0.8 g/cm³, 0.4 g/cm³ to 0.75 g/cm³, 0.4 g/cm³ to 0.7 g/cm³, 0.4 g/cm³ to 0.65 g/cm³, 0.4 g/cm³ to 0.6 g/cm³, 0.4 g/cm³ to 0.55 g/cm³, 0.4 g/cm³ to 0.5 g/cm³, 0.4 g/cm³ to 0.45 g/cm³. In a third set of ranges, the range of density is one of the following ranges: about 0.15 g/cm³ to 0.75 g/cm³, 0.15 g/cm³ to 0.7 g/cm³, 0.2 g/cm³ to 0.65 g/cm³, 0.25 g/cm³ to 0.6 g/cm³, 0.3 g/cm³ to 0.55 g/cm³, 0.3 g/cm³ to 0.5 g/cm³, 0.3 g/cm³ to 0.45 g/cm³, 0.3 g/cm³ to 0.4 g/cm³, and 0.3 g/cm³ to 0.35 g/cm³. Each of these values and ranges is embodied in the Examples. Density was determined according to the density test procedure outlined in Example 2.

In an embodiment, the insulative cellular non-aromatic polymeric material is located between and coupled to an inner layer and an outer layer to produce a multi-layer parison.

In an embodiment, a multilayer parison is produced. The parison density may be one of several different values or fall within one of several different ranges. It is within the scope of the present disclosure to select a density and be one of the following values: about 0.4, 0.45, 0.5, 0.55, 0.6, 0.65, 0.7, 0.75, 0.785, and 0.8 g/cm³. It is within the scope of the present disclosure for the density of the formulation to fall within one of many different ranges. In a first set of ranges, the range of density is one of the following ranges: about 0.4 g/cm³ to 0.8 g/cm³, 0.45 g/cm³ to 0.8 g/cm³, 0.5 g/cm³ to 0.8 g/cm³, 0.55 g/cm³ to 0.8 g/cm³, 0.6 g/cm³ to 0.8 g/cm³, 0.65 g/cm³ to 0.8 g/cm³, 0.7 g/cm³ to 0.8 g/cm³, and 0.75 g/cm³ to 0.8 g/cm³. In a second set of ranges, the range of core-layer density is one of the following ranges: about 0.4 g/cm³ to 0.75 g/cm³, 0.4 g/cm³ to 0.7 g/cm³, 0.4 g/cm³ to 0.65 g/cm³, 0.4 g/cm³ to 0.6 g/cm³, 0.4 g/cm³ to 0.55 g/cm³, 0.4 g/cm³ to 0.5 g/cm³, 0.4 g/cm³ to 0.45 g/cm³. Each of these values and ranges is embodied in the Examples. Density was determined according to the density test procedure outlined in Example 5.

In an embodiment, a multilayer parison comprises a core parison. The density of the core parison may be one of several different values or fall within one of several different ranges. It is within the scope of the present disclosure to select a density and be one of the following values: about 0.3, 0.35, 0.4, 0.45, 0.5, 0.55, 0.6, 0.65, 0.7, 0.75, 0.785, and 0.8 g/cm³. It is within the scope of the present disclosure for the density of the formulation to fall within one of many different ranges. In a first set of ranges, the range of density is one of the following ranges: about 0.3 g/cm³ to 0.8 g/cm³, 0.35 g/cm³ to 0.8 g/cm³, 0.4 g/cm³ to 0.8 g/cm³, 0.45 g/cm³ to 0.8 g/cm³, 0.5 g/cm³ to 0.8 g/cm³, 0.55 g/cm³ to 0.8 g/cm³, 0.6 g/cm³ to 0.8 g/cm³, 0.65 g/cm³ to 0.8 g/cm³, 0.7 g/cm³ to 0.8 g/cm³, and 0.75 g/cm³ to 0.8 g/cm³. In a second set of ranges, the range of density is one of the following ranges: about 0.4 g/cm³ to 0.75 g/cm³, 0.4 g/cm³ to 0.7 g/cm³, 0.4 g/cm³ to 0.65 g/cm³, 0.4 g/cm³ to 0.6 g/cm³, 0.4 g/cm³ to 0.55 g/cm³, 0.4 g/cm³ to 0.5 g/cm³, 0.4 g/cm³ to 0.45 g/cm³. Each of these values and ranges is embodied in the Examples. Density was determined according to the density test procedure outlined in Example 5.

Core layer material formulation may have an effect on the ratio of container density to parison density and/or container core layer density to parison core layer density. Some factors that may be relevant to such formulation may include the amounts of physical blowing agents used. For example, the foregoing density ratios may be proportional to the amount of talc used as a blowing agent. Other factors which may be relevant include extruder temperatures, extruder pressures, die pressures, die temperatures, thicknesses of each layer in the multi-layer tube and multi-layer container, thickness distribution between layers made from relatively low-density insulative cellular non-aromatic polymeric materials and relatively high-density polymeric materials, additives included in the core layer material formulation, blown air levels, blown air pressures, mold temperatures, blown air time, cycle time, multi-layer tube weight, multi-layer tube thickness, die swell, blow-up ratio, and any combination thereof.

Conventional blow molding techniques may involve use of pressurizing fluid at pressures of about 70 pounds per square inch. In an exemplary embodiment, the forming of multi-layer parison 12 into multi-layer container 22 is performed using a blow molding process involving use of pressurizing fluid at pressures of about 35 pounds per square inch. In other exemplary embodiments, greater or lesser fluid pressures may be used.

The core-layer density to core-parison density may be one of several different values or fall within one of several different ranges. It is within the scope of the present disclosure to select a density and be one of the following values: about 1, 1.01, 1.02, 1.03, 1.04, and 1.05 g/cm³. It is within the scope of the present disclosure for the density of the formulation to fall within one of many different ranges. In a first set of ranges, the range of core-layer density to core-parison density is one of the following ranges: about 1.0 to 2.0, 1.01 to 2.0, 1.02 to 2.0, 1.03 to 2.0, 1.04 to 2.0, 1.05 to 2.0, 1.1 to 2.0, 1.15 to 2.0, 1.2 to 2.0, 1.25 to 2.0, 1.3 to 2.0, 1.35 to 2.0, 1.4 to 2.0, 1.45 to 2.0, 1.5 to 2.0, 1.55 to 2.0, 1.6 to 2.0, 1.65 to 2.0, 1.7 to 2.0, 1.75 to 2.0, 1.8 to 2.0, 1.85 to 2.0, 1.9 to 2.0, and 1.95 to 2.0. In a second set of ranges, the range of core-layer density to core-parison density is one of the following ranges: about 1.01 to 1.95, 1.01 to 1.9, 1.01 to 1.85, 1.01 to 1.8, 1.01 to 1.75, 1.01 to 1.7, 1.01 to 1.65, 1.01 to 1.6, 1.01 to 1.55, 1.01 to 1.5, 1.01 to 1.45, 1.01 to 1.4, 1.01 to 1.35, 1.01 to 1.3, 1.01 to 1.25, 1.01 to 1.2, 1.01 to about 1.15, 1.01 to 1.1, 1.01 to 1.05, 1.01 to 1.04, 1.01 to 1.03, and 1.01 to 1.02. Density may be determined according to the density test procedure outlined in Example 5. Each of these values and ranges is embodied in the Examples.

The vessel density to the tube density may be one of several different values or fall within one of several different ranges. It is within the scope of the present disclosure to select a density and be one of the following values: about 1, 1.01, 1.02, 1.03, 1.04, and 1.05 g/cm³. It is within the scope of the present disclosure for the density of the formulation to fall within one of many different ranges. In a first set of ranges, the range of core-layer density to core-parison density is one of the following ranges: about 1.0 to 1.9, 1.01 to 1.9, 1.02 to 1.9, 1.03 to 1.9, 1.04 to 1.9, 1.05 to 1.9, 1.1 to 1.9, 1.15 to 1.9, 1.2 to 1.9, 1.25 to 1.9, 1.3 to 1.9, 1.35 to 1.9, 1.4 to 1.9, 1.45 to 1.9, 1.5 to 1.9, 1.55 to 1.9, 1.6 to 1.9, 1.65 to 1.9, 1.7 to 1.9, 1.75 to 1.9, 1.8 to 1.9, and 1.85 to 1.9. In a second set of ranges, the range of core-layer density to core-parison density is one of the following ranges: about 1.01 to 1.85, 1.01 to 1.8, 1.01 to 1.75, 1.01 to 1.7, 1.01 to 1.65, 1.01 to 1.6, 1.01 to 1.55, 1.01 to 1.5, 1.01 to 1.45, 1.01 to 1.4, 1.01 to 1.35, 1.01 to 1.3, 1.01 to 1.25, 1.01 to 1.2, 1.01 to about 1.15, 1.01 to 1.1, 1.01 to 1.05, 1.01 to 1.04, 1.01 to 1.03, and 1.01 to 1.02. Density may be determined according to the density test procedure outlined in Example 5. Each of these values and ranges is embodied in the Examples.

According to an aspect of the present disclosure, there is provided a method of producing a multilayer vessel, the method comprising the steps of (a) extruding an inner-layer formulation, a core-layer formulation, and an outer-layer formulation to form an inner parison, an outer parison, and a core parison configured to have a core-parison density different than each of an inner-parison density of the inner parison and an outer-parison density of the outer parison, (b) aligning the inner parison, the core parison, and the outer parison to cause the core parison to be located between the inner parison and the outer parison to cause the core parison to surround the inner parison and to be surrounded by the outer parison to form a multilayer tube, (c) placing the multilayer tube in a mold cavity formed in a mold, (d) forming a multilayer vessel having an interior region formed therein by expanding the multilayer tube within the mold so that the outer parison engages an inner surface of the mold, and wherein the core parison of the multilayer tube is transformed into a core layer of the vessel having a core-layer density that enables cell collapse and damage within the core layer of multilayer vessel to be minimized.

In step (b) the multi-later parison is extruded in the form of a multi-layer tube in which the core parison surrounds the inner parison and the outer parison surrounds the core parison.

In an embodiment, in step (b), the inner parison core parison, and outer parison from step (a) are aligned such that the core parison is located between the inner parison and the outer parison and the aligned parisons are then co-extruded to form the multilayer tube.

In an embodiment, the outer and inner parisons each comprise a high density polymeric material. In another embodiment, the high-density polymeric material is high density polyethylene or polypropylene.

The polypropylene used in either of the skin layers is a high stiffness polypropylene. The polypropylene can be used in either of the skin layers is a high impact polypropylene. The polypropylene can be used in either of the skin layers is DOW® D 207.03 developmental performance polypropylene resin or DOW® DC 7067.00 polypropylene impact copolymer. Reference is hereby made to U.S. patent application Ser. No. 14/468,789, filed Aug. 26, 2014 and titled POLYMERIC MATERIAL FOR CONTAINER for disclosure relating to polypropylene used in either of the skin layers in accordance with the present disclosure, which application is hereby incorporated herein by reference in its entirety.

In a particular embodiment, both of the outer and inner parisons are a formed from a polypropylene selected from DOW® D 207.03 developmental performance polypropylene resin and/or DOW® DC 7067.00 polypropylene impact copolymer.

In an embodiment, the polyethylene used in either of the inner and outer parisons is a high density ethylene hexane-1 copolymer. In an embodiment, the high density polyethylene is a HDPE hexene copolymer. In a particular embodiment, the high density polyethylene is FORMOLENE® HB5502F HDPE hexene copolymer (available from Formosa Plastics Corporation).

Alternatively, the polyethylene used in either of the inner and outer parisons may be Chevron Phillips MARLEX® HHM 5502 BN.

In certain embodiment, one or both of the inner and outer layers comprise a high-density polymeric material as hereinbefore defined and a colorant. For example, one or both of the inner and outer layers may comprise 95-99.9% (w/w) of a high-density polymeric material as hereinbefore defined and 0.1 to 5% (w/w) a colorant. In an embodiment, one or both of the inner and outer layers may comprise 97-99.9% (w/w) of a high-density polymeric material as hereinbefore defined and 0.1 to 3% (w/w) a colorant. In a further embodiment, one or both of the inner and outer layers may comprise 98-99.5% (w/w) of a high-density polymeric material as hereinbefore defined and 0.5 to 2% (w/w) a colorant. The relatively high-density polymeric material may be FORMOLENE® HB5502F HDPE hexene copolymer (available from Formosa Plastics Corporation) and the colorant may be COLORTECH® 11933-19 Titanium Oxide Colorant (available from COLORTECH® a PPM Company).

In some examples, inner-layer formulation and outer-layer formulation may be the same. In other examples, inner-layer formulation and outer-layer formulation may be different.

The core formulation is suitably as defined hereinbefore. In an embodiment, the core formulation comprises:
  85-99.9% (w/w) of a high density polyethylene (HDPE) as defined herein;
  0.1-15% (w/w) of a nucleating agent as defined herein;
  0-3% (w/w) of a slip agent as defined herein; and
  0-4% (w/w) of a colorant as defined herein.

In a further embodiment, the core formulation comprises:
  97-99.9% (w/w) of a high density polyethylene (HDPE) as defined herein;
  0.1-3% (w/w) of a nucleating agent as defined herein;
  0-3% (w/w) of a slip agent as defined herein; and
  0-3% (w/w) of a colorant as defined herein.

In a further embodiment, the core formulation comprises:
  98-99.9% (w/w) of a high density polyethylene (HDPE) as defined herein;
  0.1-2% (w/w) of a nucleating agent as defined herein;
  0-2% (w/w) of a slip agent as defined herein; and
  0-2% (w/w) of a colorant as defined herein.

In step (d) the expansion of the multilayer tube is achieved by blow molding the multi-layer tube using techniques known in the art.

According to another aspect of the present disclosure, there is provided a multi-layer vessel obtainable, obtained, or directly obtained by a process defined herein.

The following examples illustrate certain core layer formulations and characteristics of multi-layer parisons and containers including core layers made from such formulations.

The following numbered clauses include embodiments that are contemplated and non-limiting:

Clause 1. A method of producing a multilayer vessel, the method comprising the steps of extruding an inner-layer formulation, a core-layer formulation, and an outer-layer formulation to form an inner parison, an outer parison, and a core parison configured to have a core-parison density different than each of an inner-parison density of the inner parison and an outer-parison density of the outer parison, aligning the inner parison, the core parison, and the outer parison to cause the core parison to be located between the inner parison and the outer parison to cause the core parison to surround the inner parison and to be surrounded by the outer parison to form a multilayer tube, placing the multilayer tube in a mold cavity formed in a mold, and expanding the multilayer tube to cause the multilayer tube to deform so that the outer parison engages an inner surface of the mold and a multilayer vessel having an interior region formed therein is provided and to transform the core parison into a core layer having a core-layer density which results from minimizing cell collapse and damage in the core layer of multilayer vessel.

Clause 2. The method of any other clause, wherein a ratio of the core-layer density to the core-parison density is in a range of about 1.0 to about 2.0.

Clause 3. The method of any other clause, wherein a ratio of the core-layer density to the core-parison density is in a range of about 1.0 to about 1.5.

Clause 4. The method of any other clause, wherein a ratio of the core-layer density to the core-parison density is in a range of about 1.0 to about 1.25.

Clause 5. The method of any other clause, wherein a ratio of the core-layer density to the core-parison density is in a range of about 1.0 to about 1.1.

Clause 6. The method of any other clause, wherein a ratio of the core-layer density to the core-parison density is about 1.

Clause 7. The method of any other clause, wherein the multilayer vessel has a vessel density, the multilayer tube has a tube density, and a ratio of the vessel density to the tube density is in a range of about 1.0 to about 1.9.

Clause 8. The method of any other clause, wherein the ratio of the vessel density to the tube density is in a range of about 1.0 to about 1.5.

Clause 9. The method of any other clause, wherein the ratio of the vessel density to the tube density is in a range of about 1.0 to about 1.25.

Clause 10. The method of any other clause, wherein the ratio of the vessel density to the tube density is in a range of about 1.0 to about 1.1.

Clause 11. The method of any other clause, wherein the ratio of the vessel density to the tube density is about 1.

Clause 12. The method of any other clause, wherein during the expanding step, the inner parison is transformed into an inner layer of the multilayer vessel having an inner-layer density and the inner-layer density is about the same as the inner-parison density.

Clause 13. The method of any other clause, wherein during the expanding step, the outer parison is transformed into an outer layer of the multilayer vessel having an outer-layer density and outer-layer density is about the same as the outer-parison density.

Clause 14. The method of any other clause, wherein the multilayer vessel further comprises a layer selected from the group consisting of an oxygen barrier layer, an oxygen scavenging layer, a UV barrier layer, a tie layer, an additional structural layer, and combinations thereof.

Clause 15. The method of any other clause, wherein each of the inner layer, outer layer, and core layer comprise a polymeric material.

Clause 16. The method of any other clause, wherein the polymeric material of the core layer is an insulative cellular non-aromatic polymeric material.

Clause 17. The method of any other clause, wherein the insulative cellular non-aromatic polymeric material comprises cells of gas entrained within a layer of base material.

Clause 18. The method of any other clause, wherein the polymeric material comprises polypropylene.

Clause 19. The method of any other clause, wherein the polypropylene has a melt strength greater than 36 cN.

Clause 20. The method of any other clause, wherein the multi-layer vessel is a bottle.

Clause 21. The method of any other clause, wherein the core-layer formulation comprises a polyethylene.

Clause 22. The method of any other clause, wherein the polyethylene is high density polyethylene (HDPE).

Clause 23. The method of any other clause, wherein the HDPE is a HDPE hexene copolymer.

Clause 24. The method of any other clause, wherein the core-layer formulation comprises one or more high density polyethylene base resins (HDPE).

Clause 25. The method of any other clause, wherein the HDPE is unimodal.

Clause 26. The method of any other clause, wherein the unimodal HDPE is a unimodal, high-melt strength HDPE.

Clause 27. The method of any other clause, wherein the unimodal, high-melt strength HDPE is electron beam modified.

Clause 28. The method of any other clause, wherein the electron beam modified unimodal, high-melt strength HDPE has long chain branching and a melt index of about 0.25 g/10 min.

Clause 29. The method of any other clause, wherein the one or more HDPE base resins is two HDPE base resins.

Clause 30. The method of any other clause, wherein the two polyethylene base resins are 50% of each base resin.

Clause 31. The method of any other clause, wherein the base resins are 50% of a unimodal HDPE and 50% of an electron beam modified HDPE.

Clause 32. The method of any other clause, wherein the core-layer formulation comprises about 85% to 99.9% (w/w) HDPE base resin.

Clause 33. The method of any other clause, wherein the core-layer formulation comprises about 97% to about 99.9% HDPE base resin.

Clause 34. The method of any other clause, wherein the core-layer formulation comprises about 98% to about 99.9% HDPE base resin.

Clause 35. The method of any other clause, wherein the core-layer formulation comprises a nucleating agent.

Clause 36. The method of any other clause, wherein the nucleating agent is a chemical nucleating agent, a physical nucleating agent, or both a chemical nucleating agent and a physical nucleating agent.

Clause 37. The method of any other clause, wherein the nucleating agent is about 0.1% to 15% (w/w) of the core-layer formulation.

Clause 38. The method of any other clause, wherein the physical nucleating agent is selected from the group consisting of talc, calcium carbonate, mica, and mixtures thereof.

Clause 39. The method of any other clause, wherein the physical nucleating agent is up to about 7% (w/w) of the core-layer formulation.

Clause 40. The method of any other clause, wherein the physical nucleating agent is about 0.1% to 0.5% (w/w) of the core-layer formulation.

Clause 41. The method of any other clause, wherein the physical nucleating agent is talc.

Clause 42. The method of any other clause, wherein the core-layer formulation lacks talc.

Clause 43. The method of any other clause, wherein the chemical nucleating agent is a blowing agent.

Clause 44. The method of any other clause, wherein the blowing agent is citric acid or a citric acid-based material.

Clause 45. The method of any other clause, wherein the chemical blowing agent is a citric acid and a crystal nucleating agent.

Clause 46. The method of any other clause, wherein the chemical blowing agent is selected from the group consisting of azodicarbonamide; azodiisobutyro-nitrile; benzene-sulfonhydrazide; 4,4-oxybenzene sulfonylsemicarbazide; p-toluene sulfonyl semi-carbazide; barium azodicarboxylate; N,N'-dimethyl-N,N'-dinitrosoterephthalamide; trihydrazino triazine; methane; ethane; propane; n-butane; isobutane; n-pentane; isopentane; neopentane; methyl fluoride; perfluoromethane; ethyl fluoride; 1,1-difluoroethane; 1,1,1-trifluoroethane; 1,1,1,2-tetrafluoro-ethane; pentafluoroethane; perfluoroethane; 2,2-difluoropropane; 1,1,1-trifluoropropane; perfluoropropane; perfluorobutane; perfluorocyclobutane; methyl chloride; methylene chloride; ethyl chloride; 1,1,1-trichloroethane; 1,1-dichloro-1-fluoroethane; 1-chloro-1,1-difluoroethane; 1,1-dichloro-2,2,2-trifluoroethane; 1-chloro-1,2,2,2-tetrafluoroethane; trichloromonofluoromethane; dichlorodifluoromethane; trichlorotrifluoroethane; dichlorotetrafluoroethane; chloroheptafluoropropane; dichlorohexafluoropropane; methanol; ethanol; n-propanol; isopropanol; sodium bicarbonate; sodium carbonate; ammonium bicarbonate; ammonium carbonate; ammonium nitrite; N,N'-dimethyl-N,N'-dinitrosoterephthalamide; N,N'-dinitrosopentamethylene tetramine; azodicarbonamide; azobisisobutylonitrile; azocyclohexylnitrile; azodiaminobenzene; bariumazodicarboxylate; benzene sulfonyl hydrazide; toluene sulfonyl hydrazide; p,p'-oxybis(benzene sulfonyl hydrazide); diphenyl sulfone-3,3'-disulfonyl hydrazide; calcium azide; 4,4'-diphenyl disulfonyl azide; and p-toluene sulfonyl azide.

Clause 47. The method of any of any other clause, wherein the core-layer formulation further comprises a physical blowing agent.

Clause 48. The method of any other clause, wherein the physical blowing agent is selected from the group consisting of carbon dioxide, nitrogen, helium, argon, air, an alkane, and mixtures thereof.

Clause 49. The method of any other clause, wherein the alkane is pentane or butane.

Clause 50. The method of any other clause, wherein the core-layer formulation further comprises a slip agent.

Clause 51. The method of any other clause, wherein the slip agent is about 0% to 3% (w/w) of the core-layer formulation.

Clause 52. The method of any other clause, wherein the slip agent is an amide of fat or fatty acid, a low molecular weight amide, or fluoroelastomer.

Clause 53. The method of any other clause, wherein the fatty acid amide is a single unsaturated $C_{18}$ to $C_{22}$ amide.

Clause 54. The method of any other clause, wherein the fatty acid amide is erucamide or oleamide.

Clause 55. The method of any other clause, wherein the core-layer formulation further comprises a colorant.

Clause 56. The method of any other clause, wherein the colorant is titanium dioxide.

Clause 57. The method of any other clause, wherein the colorant is about 0% to 4% (w/w) of the core-layer formulation.

EXAMPLE 1

Formulation and Extrusion

FORMOSA PLASTICS® FORMOLENE™ HB5502F HDPE hexane copolymer was used as the polyethylene base resin. The polyethylene base resin was blended with HYDROCEROL® CF 40E as a nucleating agent, and $N_2$ as a blowing agent. The percentages were about:

99.25% FORMOLENE™ HB5502F HDPE hexane copolymer 0.75% HYDROCEROL® CF 40E

The HDPE and nucleating agent were added to an extruder hopper and blended to provide a formulation. The formulation was then heated in the extruder to form a molten formulation. The blowing agent was then added to the molten formulation at a rate of about:

0.1 lbs/hr

The $N_2$ was injected in to the molten formulation to expand the molten formulation and reduce the density of the mixture of polymer and nucleating agent. The resulting expanded formulation was then extruded through a die head to establish a parison Inner and outer polymeric layers also were extruded through the die head, locating the expanded formulation therebetween, to form multi-layer parison 12. Multi-layer parison 12 was then blow molded to form multi-layer container 22.

Test Results

Multi-layer parison had a density of about 0.688 g/cm³. Multi-layer parison 12 was blow molded to form a container having a density of about 0.723 g/cm³. The ratio of container density to parison density, therefore, was about 1.051

EXAMPLE 2

Formulation and Extrusion

FORMOSA PLASTICS® FORMOLENE™ HB5502F HDPE hexane copolymer was used as the polyethylene base resin. The polyethylene base resin was blended with HYDROCEROL® CF 40E as a nucleating agent, Heritage Plastics HT6000 LLDPE Based Talc Concentrate as an additional nucleating agent, and $N_2$ as a blowing agent. The percentages were about:

98.75% FORMOLENE™ HB5502F HDPE hexane copolymer 0.75% HYDROCEROL® CF 40E 0.5% Heritage Plastics HT6000 LLDPE Based Talc Concentrate The HDPE and nucleating agents were added to an extruder hopper and blended to provide a formulation. The formulation was then heated in the extruder to form a molten formulation. The blowing agent was then added to the molten formulation at a rate of about:

0.125 lbs/hr

The $N_2$ was injected in to the molten formulation to expand the molten formulation and reduce the density of the mixture of polymer and nucleating agent. The resulting expanded formulation was then extruded through a die head to establish a parison Inner and outer polymeric layers also were extruded through the die head, locating the expanded formulation therebetween, to form a multi-layer parison.

Test Results

The multi-layer parison had a density of about 0.568 g/cm³. The multi-layer parison was blow molded to form a container having a density of about 0.606 g/cm³. The ratio of container density to parison density, therefore, was about 1.067.

EXAMPLE 3

Formulation and Extrusion

FORMOSA PLASTICS® FORMOLENE™ HB5502F HDPE hexane copolymer was used as the polyethylene base resin. The polyethylene base resin was blended with HYDROCEROL® CF 40E as a nucleating agent, and $N_2$ as a blowing agent. The percentages were about:

98.00% FORMOLENE™ HB5502F HDPE hexane copolymer 2.00% HYDROCEROL® CF 40E

The HDPE and nucleating agent were added to an extruder hopper and blended to provide a formulation. The formulation was then heated in the extruder to form a molten formulation. The blowing agent was then added to the molten formulation at a rate of about:

0.125 lbs/hr

The $N_2$ was injected in to the molten formulation to expand the molten formulation and reduce the density of the mixture of polymer and nucleating agent. The resulting expanded formulation was then extruded through a die head to establish a parison Inner and outer polymeric layers also were extruded through the die head, locating the expanded formulation therebetween, to form a multi-layer parison.

Test Results

The multi-layer parison had a density of about 0.416 g/cm$^3$. The multi-layer parison was blow molded to form a container having a density of about 0.481 g/cm$^3$. The ratio of container density to parison density, therefore, was about 1.157.

EXAMPLE 4

Formulation and Extrusion

FORMOSA PLASTICS® FORMOLENE™ HB5502F HDPE hexane copolymer was blended with DOW® DOWLEX™ IP 41 HDPE (available from The Dow Chemical Company) that has been electron beam modified to provide long chain branching and a melt index of about 0.25 g/10 min for use as the polyethylene base resins. The polyethylene base resin mixture was blended with HYDROCEROL® CF 40E as a nucleating agent, Heritage Plastics HT6000 LLDPE Based Talc Concentrate as an additional nucleating agent, and N$_2$ as a blowing agent. The percentages were about:

24.6875% FORMOLENE™ HB5502F HDPE hexane copolymer
74.0625% Modified DOWLEX™ IP 41 HDPE
0.75% HYDROCEROL® CF 40E
0.5% Heritage Plastics HT6000 LLDPE Based Talc Concentrate The base resins and nucleating agents were added to an extruder hopper and blended to provide a formulation. The formulation was then heated in the extruder to form a molten formulation. The blowing agent was then added to the molten formulation at a rate of about:

0.125 lbs/hr

The N$_2$ was injected in to the molten formulation to expand the molten formulation and reduce the density of the mixture of polymer and nucleating agent. The resulting expanded formulation was then extruded through a die head to establish a parison Inner and outer polymeric layers also were extruded through the die head, locating the expanded formulation therebetween, to form a multi-layer parison.

Test Results

The multi-layer parison had a density of about 0.568 g/cm$^3$. The multi-layer parison was blow molded to form a container having a density of about 0.606 g/cm$^3$. The ratio of container density to parison density, therefore, was about 1.067.

EXAMPLE 5

Density Measurements

This Example demonstrates the test used to measure the density of filled and unfilled polymer parts.

Procedure

Figure 7:
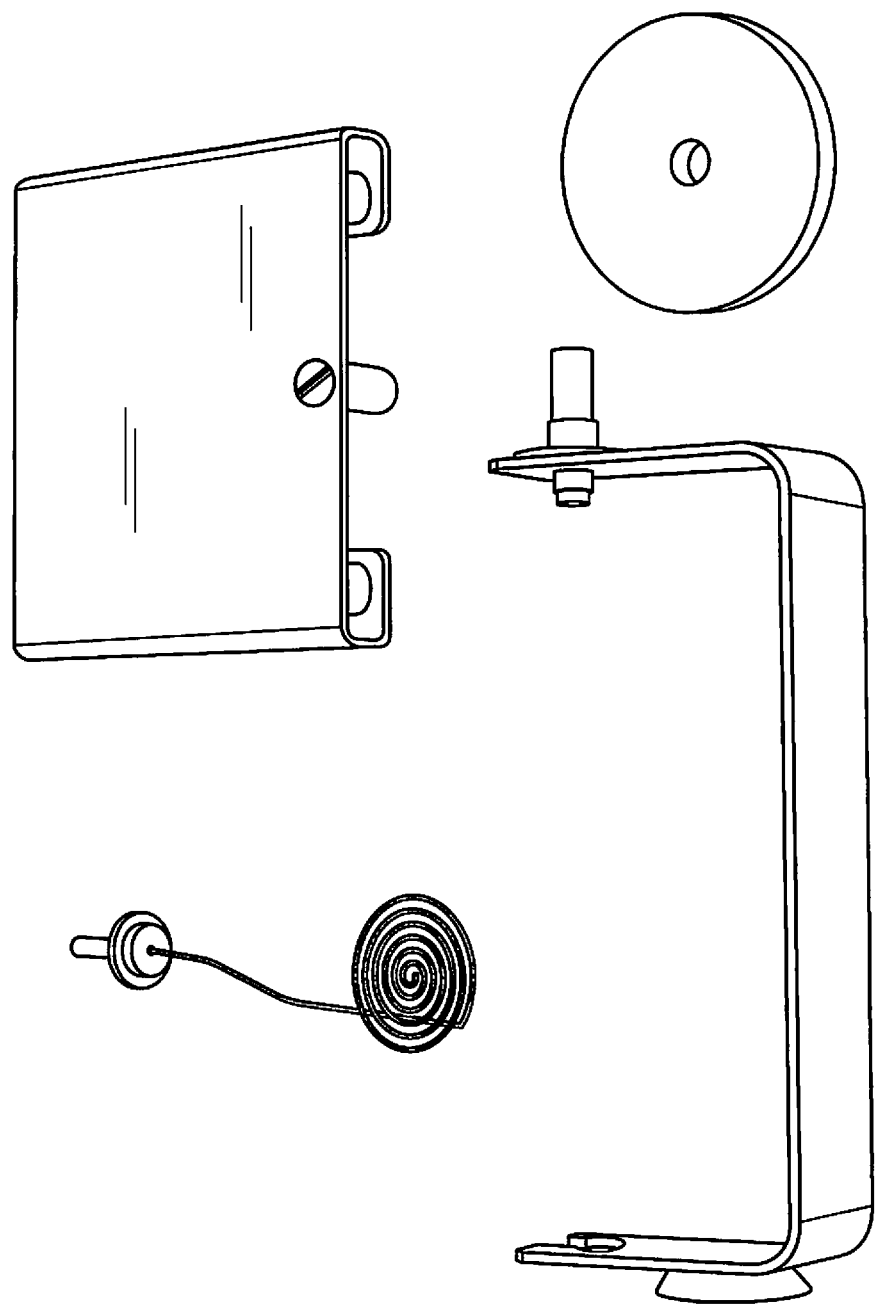
FIG. 7 is a perspective view of an unassembled density determination apparatus showing the components (clockwise starting in the upper left) gem holder, platform, suspension bracket, and suspension spacer.

The density was determined by the apparatus shown, unassembled, in FIG. 7. Although not shown in FIG. 7, the apparatus also included a thermometer to measure the suspension liquid temperature. A suspension liquid is a fluid with a density lower than that of the sample to be measured. The sample must sink in the suspension fluid to determine the sample density. Water has a density of 1 g/cm3, so most unfilled polymers require some other suspension fluid such as isopropyl alcohol, density=0.8808 g/cm3. A Mettler AT400 balance (Mettler-Toledo LLC, Columbus, Ohio) was also used.

The density of a limestone-filled HDPE bottle was measured. After taring the balance to zero, the dry solid sample was weighed after placing it in the cup of the Mettler balance. The dry weight was 0.3833 g. After weighing the dry sample and before removing the sample from the cup, the balance was tared again. The sample was removed from the cup and placed on the gem holder in the suspension fluid. The sample was weighed providing the weight with a negative number (−0.3287 g). The number was converted to its absolute value (0.3287 g); the positive value is the sample buoyancy. The sample density was calculated by multiplying the dry weight (0.3833 g) by the sample buoyancy (0.3287 g) by the suspension fluid density (0.8808 g/cc), which equaled 1.0272 g/cc.

EXAMPLE 6

Formulation and Extrusion

In some examples core-layer formulation 48 comprised FORMOSA PLASTICS® FORMOLENE® HB5502F HDPE hexene copolymer as a first material of a polyolefin base resin. In further examples, core-layer formulation 48 comprised Borealis DAPLOY™ WB140HMS Polypropylene (PP) (available from Borealis AG) as the first material. In still further examples, core-layer formulation 48 comprised DOW® DOWLEX™ IP 41 HDPE (available from The Dow Chemical Company) that had been electron beam modified to provide long chain branching and a melt index of about 0.25 g/10 min as the first material.

In some examples the polyolefin base resin further comprised a polypropylene homopolymer resin, F020HC, available from Braskem, as a secondary material of a polyolefin base resin. In further examples, EQUISTAR® ALATHON® H5520 HDPE copolymer (available from Lyondell Chemical Company) was used as the secondary material. In still further examples, EQUISTAR® ALATHON® H5520 HDPE copolymer (available from Lyondell Chemical Company), electron beam modified to have long-chain branching and a melt index of about 0.25 g/10 min, was used as the secondary material.

In some examples, the polyolefin base resin was blended with HYDROCEROL® CF 40E as a chemical blowing agent and nucleating agent. In further examples, Heritage Plastics HT6000 LLDPE Based Talc Concentrate was added as a nucleating agent. N$_2$ was used as a blowing agent.

In some examples, the polyolefin base resin was also blended with Ampacet 102823 Process Aid PE MB LLDPE. In further examples, Heritage Plastics HT4P was added as a nucleating agent. In still further examples, the blowing agent was used at levels between about 0.01 lbs/hr to about 1.25 lbs/hour. In yet further examples, the polyolefin base resin was blended with DOW® AFFINITY™ PL 1880G polyolefin plastomer as an impact modifier. In still yet further examples, COLORTECH® 11933-19 was added as a colorant.

The blowing agent, N$_2$, was injected into the molten formulation to expand the molten formulation and reduce the density of the mixture of polymer and nucleating agent. The resulting expanded formulation was then extruded through a die head to establish a core-layer parison Inner and outer layers were extruded through the die head, locating the expanded formulation therebetween, to form a multi-layer tube. The multi-layer tube was molded to form a container according to the present disclosure.

Formulations described by this Example are detailed in Table 1.

TABLE 1

Comparison of different insulative cellular non-aromatic polymeric material formulations of Example 6.

| Trial | 1° Resin | 2° Resin | Additive #1 | Additive #2 | Additive #3 | Additive #4 | Gas [lbs/hr] |
|---|---|---|---|---|---|---|---|
| Versalite T3 R2 | 81.45% Borealis | 15% Braskem | 0.05% CF-40E | 2% Ampacet | 1% Colortech | 0.5% HT4HP | 0.751 N2 |
| Versalite T3 R3 | 81.45% Borealis | 15% Braskem | 0.05% CF-40E | 2% Ampacet | 1% Colortech | 0.5% HT4HP | 0.750 N2 |
| Versalite T3 R4 | 81.45% Borealis | 15% Braskem | 0.05% CF-40E | 2% Ampacet | 1% Colortech | 0.5% HT4HP | 0.750 N2 |
| Versalite T3 R5 | 81.45% Borealis | 15% Braskem | 0.05% CF-40E | 2% Ampacet | 1% Colortech | 0.5% HT4HP | 0.740 N2 |
| Versalite T3 R6 | 81% Borealis | 15% Braskem | 0.5% CF-40E | 2% Ampacet | 1% Colortech | 0.5% HT4HP | 0.740 N2 |
| Versalite T3 R7 | 81% Borealis | 15% Braskem | 0.5% CF-40E | 2% Ampacet | 1% Colortech | 0.5% HT4HP | 1.0 N2 |
| Versalite T3 R8 | 80.5% Borealis | 15% Braskem | 1.0% CF-40E | 2% Ampacet | 1% Colortech | 0.5% HT4HP | 1.0 N2 |
| Versalite T3 R9 | 80.5% Borealis | 15% Braskem | 1.0% CF-40E | 2% Ampacet | 1% Colortech | 0.5% HT4HP | 1.0 N2 |
| Versalite T3 R10 | 80.5% Borealis | 15% Braskem | 1.0% CF-40E | 2% Ampacet | 1% Colortech | 0.5% HT4HP | 1.0 N2 |
| V5 | 85% Formosa | 0% | 15% HT6000 | 4% Color (Top) | 0% | 0% | 0.011 N2 |
| V6 | 85% Formosa | 0% | 15% HT6000 | 4% Color (Top) | 0% | 0% | 0.011 N2 |
| V7 | 85% Formosa | 0% | 15% HT6000 | 4% Color (Top) | 0% | 0% | 0.011 N2 |
| V8 | 85% Formosa | 0% | 15% HT6000 | 4% Color (Top) | 0% | 0% | 0.011 N2 |
| V14 | 96.5% Dow | 0% | 0.5% CF-40E | 2% Ampacet | 1% Colortech | 0% | 0.9 N2 |
| V15 | 98.25% Dow | 0% | 0.25% CF-40E | 1% Ampacet | 0.5% Colortech | 0% | 0.9 CO2 |
| V16 | 96.5% Formosa | 0% | 0.5% CF-40E | 2% Ampacet | 1% Colortech | 0% | 0.9 CO2 |
| V17 | 95% Formosa | 0% | 1.5% CF-40E | 2% Ampacet | 1% Colortech | 0.5% HT4HP | 0.8 CO2 |
| V18 | 95% Formosa | 0% | 1.5% CF-40E | 2% Ampacet | 1% Colortech | 0.5% HT4HP | 1.1 CO2 |
| V19 | 47.5% Formosa | 47.5% LBI | 1.5% CF-40E | 2% Ampacet | 1% Colortech | 0.5% HT4HP | 0.9 N2 |
| V20 | 47.5% Formosa | 47.5% LBI | 1.5% CF-40E | 2% Ampacet | 1% Colortech | 0.5% HT4HP | 1.2 N2 |
| V21 | 95% Formosa | 0% | 1.5% CF-40E | 2% Ampacet | 1% Colortech | 0.5% HT4HP | 0.9 N2 |
| V22 | 95% Formosa | 0% | 1.5% CF-40E | 2% Ampacet | 1% Colortech | 0.5% HT4HP | 0.9 N2 |
| V23 | 95% Formosa | 0% | 1.5% CF-40E | 2% Ampacet | 1% Colortech | 0.5% HT4HP | 0.9 N2 |
| V24 | 96% Formosa | 0% | 0.5% CF-40E | 2% Ampacet | 1% Colortech | 0.5% HT4HP | 0.9 N2 |
| V25 | 96% Formosa | 0% | 0.5% CF-40E | 2% Ampacet | 1% Colortech | 0.5% HT4HP | 0.9 N2 |
| V26 | 96% Formosa | 0% | 0.5% CF-40E | 2% Ampacet | 1% Colortech | 0.5% HT4HP | 0.9 N2 |
| V27 | 96% Formosa | 0% | 0.5% CF-40E | 2% Ampacet | 1% Colortech | 0.5% HT4HP | 0.9 N2 |
| V28 | 96% Formosa | 0% | 0.5% CF-40E | 2% Ampacet | 1% Colortech | 0.5% HT4HP | 0.9 N2 |
| V 16-0 | 96.5% Formosa | 0% | 0.5% CF-40E | 2% Ampacet | 1% Colortech | | 0.9 N2 |
| V 16-1 | 99.9% Formosa | 0% | 0.1% CF-40E | 0% | 0% | 0% | 0.3 N2 |
| V 16-2 | 99.4% Formosa | 0% | 0.1% CF-40E | 0.5% HT6000 | 0% | 0% | 1.0 N2 |
| V 16-3 | 97.4% Formosa | 0% | 0.1% CF-40E | 2.5% HT6000 | 0% | 0% | 1.25 N2 |
| V 16-4 | 99.25% Formosa | 0% | 0.75% CF-40E | 0% | 0% | 0% | 1.0 N2 |
| V 16-5 | 98.75% Formosa | 0% | 0.75% CF-40E | 0.5% HT6000 | 0% | 0% | 1.25 N2 |
| V 16-6 | 96.75% Formosa | 0% | 0.75% CF-40E | 2.5% HT6000 | 0% | 0% | 0.3 N2 |
| V 16-7 | 98% Formosa | 0% | 2% CF-40E | 0% | 0% | 0% | 1.25 N2 |
| V 16-8 | 97.5% Formosa | 0% | 2% CF-40E | 0.5% HT6000 | 0% | 0% | 0.3 N2 |

TABLE 1-continued

Comparison of different insulative cellular non-aromatic polymeric material formulations of Example 6.

| Trial | 1° Resin | 2° Resin | Additive #1 | Additive #2 | Additive #3 | Additive #4 | Gas [lbs/hr] |
|---|---|---|---|---|---|---|---|
| V 16-9 | 95.5% Formosa | 0% | 2% CF-40E | 2.5% HT6000 | 0% | 0% | 1.0 N2 |
| V 20-1 | 24.975% Formosa | 74.925% LBI 0.25MI | 0.1% CF-40E | 0% | 0% | 0% | 0.3 N2 |
| V 20-2 | 24.6875% Formosa | 74.0625% LBI 0.25MI | 0.75% CF-40E | 0.5% HT6000 | 0% | 0% | 1.0 N2 |
| V 20-3 | 23.875% Formosa | 71.625% LBI 0.25MI | 2% CF-40E | 2.5% HT6000 | 0% | 0% | 1.25 N2 |
| V 20-4 | 49.7% Formosa | 49.7% LBI 0.25MI | 0.1% CF-40E | 0.5% HT6000 | 0% | 0% | 1.25 N2 |
| V 20-5 | 48.375% Formosa | 48.375% LBI 0.25MI | 0.75% CF-40E | 2.5% HT6000 | 0% | 0% | 0.3 N2 |
| V 20-6 | 49% Formosa | 49% LBI 0.25MI | 2% CF-40E | 0% | 0% | 0% | 1.0 N2 |
| V 20-7 | 73.05% Formosa | 24.35% LBI 0.25MI | 0.1% CF-40E | 2.5% HT6000 | 0% | 0% | 1.0 N2 |
| V 20-8 | 74.4375% Formosa | 24.8125% LBI 0.25MI | 0.75% CF-40E | 0% | 0% | 0% | 1.25 N2 |
| V 20-9 | 73.125% Formosa | 24.375% LBI 0.25MI | 2% CF-40E | 0.5% HT6000 | 0% | 0% | 0.3 N2 |
| V 16-5-1 | 98.75% Formosa | 0% | 0.75% CF-40E | 0.4% HT6000 | 0% | 0% | 1.25 N2 |
| V 16-5-2 | 98.75% Formosa | 0% | 0.75% CF-40E | 0.3% HT6000 | 0% | 0% | 1.25 N2 |
| V 16-5-3 | 98.75% Formosa | 0% | 0.75% CF-40E | 0.2% HT6000 | 0% | 0% | 1.25 N2 |
| V 20-4-1 | 42.25% Formosa | 42.25% LBI 0.25MI | 15% Dow Impact Mod | 0.1% CF-40E | 0.4% HT6000 | 0% | 1.25 N2 |
| V 20-4-2 | 42.25% Formosa | 42.25% LBI 0.25MI | 15% Dow Impact Mod | 0.1% CF-40E | 0.4% HT6000 | 0% | 1.0 N2 |
| V 20-4-3 | 42.25% Formosa | 42.25% LBI 0.25MI | 15% Dow Impact Mod | 0.1% CF-40E | 0.4% HT6000 | 0% | 1.0 N2 |
| V 20-4-4 | 42.25% Formosa | 42.25% LBI 0.25MI | 15% Dow Impact Mod | 0.1% CF-40E | 0.4% HT6000 | 0% | 1.0 N2 |

EXAMPLE 7

Drop Test Measurements

General Procedure

Drop testing determines a likelihood of container survival due to a drop or impact to the container. Multi-layer containers were subjected to a drop testing procedure based on ASTM D2463 (Standard Test Method for Drop Impact Resistance of Blow-Molded Thermoplastic Containers), which is incorporated by reference herein in its entirety.

The drop test was performed according to the following procedure. A bucket was filled with tap water. The water in the bucket was allowed to condition for at least 24 hours at about 73 degrees Fahrenheit (22.8 degrees Celsius) and about 50% relative humidity. The container was filled with water from the bucket and closed off with, for example, a lid. The filled, capped containers were then subjected to the following procedure: (a) the filled, capped container was located at about five feet above a hard surface such as concrete or tile; (b) the filled, capped container was then oriented such that a bottom of the filled, capped container was arranged to lie in a substantially parallel relation to the hard surface; (c) each of ten capped, filled containers were dropped; (d) upon impact, each filled, capped container was examined for any break or shattering of the wall that causes water to leak out of the bottle; and (d) the total number of bottles showing any sign of leakage after the drop test were counted as failures.

EXAMPLE 8

Weight, Bottle Density, Parison Densities, Parison-Core Density, EBM Efficiency, EBM-Core Efficiency, and Drop Test Results for Formulations of Example 6

Multi-layer containers formed according to Table 1 were subjected to a series of measurements and performance tests including weight measurements, bottle density measurements, bottle-core density measurements, parison density measurements, parison-core density measurements, EBM efficiency measurements, EBM-core measurements, and drop testing. The results are shown below in Table 2.

EBM Efficiency ratio below is determined by dividing the bottle density by the parison density. EBM-Core Efficiency ratio below is determined by dividing the bottle-core density by the parison-core density.

Density was determined by the apparatus and methods described in Example 5. Drop tests were conducted by methods described in Example 7.

TABLE 2

Weight, bottle density, bottle-core density, parison density, parison-core density, EBM efficiency, EBM-core, and drop test of different insulative cellular non-aromatic polymeric material formulations of Example 6.

| Trial | Weight [g] | Bottle Density [g/cm3] | Bottle-Core Density [g/cm3] | Parison Density [g/cm3] | Parison-Core Density [g/cm3] | EBM Efficiency Ratio | EBM-Core Efficiency Ratio | Fail Drop Test [10 Bottles] |
|---|---|---|---|---|---|---|---|---|
| Versalite T3 R2 | * | 0.670 | 0.631 | * | * | * | * | * |
| Versalite T3 R3 | * | 0.670 | 0.631 | * | * | * | * | * |
| Versalite T3 R4 | * | 0.700 | 0.665 | * | * | * | * | * |
| Versalite T3 R5 | * | 0.710 | 0.677 | * | * | * | * | * |
| Versalite T3 R6 | * | 0.690 | 0.654 | * | * | * | * | * |
| Versalite T3 R7 | * | 0.530 | 0.472 | * | * | * | * | * |
| Versalite T3 R8 | 28 | 0.490 | 0.427 | * | * | * | * | * |
| Versalite T3 R9 | * | 0.540 | 0.483 | * | * | * | * | * |
| Versalite T3 R10 | * | 0.490 | 0.427 | * | * | * | * | * |
| V5 | 36.6 | 0.750 | 0.722 | * | * | * | * | * |
| V6 | 36.3 | 0.757 | 0.730 | * | * | * | * | * |
| V7 | 36.6 | 0.860 | 0.847 | * | * | * | * | * |
| V8 | 36.1 | 0.816 | 0.797 | * | * | * | * | * |
| V14 | 36 | 0.706 | 0.672 | 0.480 | 0.415 | 1.472 | 1.620 | 100% |
| V15 | 36 | 0.794 | 0.772 | * | * | * | * | * |
| V16 | 36 | 0.797 | 0.775 | 0.481 | 0.417 | 1.656 | 1.861 | 0% |
| V17 | 36 | 0.806 | 0.786 | 0.455 | 0.387 | 1.771 | 2.031 | 10% |
| V18 | 36 | 0.753 | 0.725 | 0.451 | 0.382 | 1.670 | 1.898 | 10% |
| V19 | 36 | 0.649 | 0.607 | 0.423 | 0.350 | 1.536 | 1.736 | 30% |
| V20 | 36 | 0.519 | 0.460 | 0.396 | 0.320 | 1.312 | 1.439 | 60% |
| V21 | 36 | 0.690 | 0.654 | 0.455 | 0.387 | 1.517 | 1.690 | 0% |
| V22 | 32 | 0.693 | 0.657 | 0.447 | 0.378 | 1.550 | 1.740 | 0% |
| V23 | 28 | 0.718 | 0.686 | 0.467 | 0.401 | 1.537 | 1.712 | 0% |
| V24 | 28 | 0.785 | 0.762 | 0.503 | 0.442 | 1.561 | 1.726 | 0% |
| V25 | 24 | 0.788 | 0.765 | 0.516 | 0.456 | 1.527 | 1.678 | 20% |
| V26 | 24 | 0.736 | 0.706 | 0.495 | 0.433 | 1.485 | 1.631 | 0% |
| V27 | 40 | 0.752 | 0.724 | 0.496 | 0.433 | 1.516 | 1.670 | 0% |
| V28 | 36 | 0.749 | 0.721 | 0.473 | 0.408 | 1.582 | 1.768 | 0% |
| V 16-0 | 36 | 0.779 | 0.755 | 0.498 | 0.436 | 1.564 | 1.732 | 0% |
| V 16-1 | 36 | 0.918 | 0.913 | 0.785 | 0.762 | 1.170 | 1.199 | 0% |
| V 16-2 | 36 | 0.730 | 0.699 | 0.502 | 0.441 | 1.453 | 1.587 | 0% |
| V 16-3 | 36 | 0.632 | 0.588 | 0.434 | 0.363 | 1.454 | 1.617 | 20% |
| V 16-4 | 36 | 0.723 | 0.691 | 0.688 | 0.651 | 1.051 | 1.061 | 0% |
| V 16-5 | 36 | 0.606 | 0.558 | 0.568 | 0.515 | 1.067 | 1.084 | 0% |
| V 16-6 | 36 | 0.892 | 0.884 | 0.470 | 0.404 | 1.899 | 2.189 | 0% |
| V 16-7 | 36 | 0.481 | 0.416 | 0.416 | 0.342 | 1.157 | 1.217 | 60% |
| V 16-8 | 36 | 0.846 | 0.831 | 0.478 | 0.413 | 1.770 | 2.013 | 0% |
| V 16-9 | 36 | 0.597 | 0.548 | 0.411 | 0.336 | 1.453 | 1.629 | 0% |
| V 20-1 | 36 | 0.906 | 0.899 | 0.771 | 0.746 | 1.174 | 1.205 | 60% |
| V 20-2 | 36 | 0.668 | 0.629 | 0.611 | 0.564 | 1.093 | 1.114 | 100% |
| V 20-3 | 36 | 0.851 | 0.837 | 0.720 | 0.688 | 1.182 | 1.216 | * |
| V 20-4 | 36 | 0.668 | 0.629 | 0.436 | 0.365 | 1.532 | 1.721 | 20% |
| V 20-5 | 36 | 0.903 | 0.896 | 0.711 | 0.677 | 1.271 | 1.323 | 20% |
| V 20-6 | 36 | 0.626 | 0.581 | 0.425 | 0.353 | 1.472 | 1.646 | 60% |
| V 20-7 | 36 | 0.751 | 0.723 | 0.495 | 0.432 | 1.517 | 1.672 | 20% |
| V 20-8 | 36 | 0.578 | 0.526 | 0.422 | 0.349 | 1.371 | 1.509 | 20% |
| V 20-9 | 36 | 0.858 | 0.845 | 0.566 | 0.513 | 1.516 | 1.646 | 40% |
| V 16-5-1 | 36 | 0.573 | 0.521 | 0.414 | 0.341 | 1.384 | 1.530 | 20% |
| V 16-5-2 | 36 | 0.577 | 0.525 | 0.407 | 0.332 | 1.417 | 1.580 | 0% |
| V 16-5-3 | 36 | 0.610 | 0.563 | 0.399 | 0.323 | 1.530 | 1.744 | 20% |
| V 20-4-1 | 36 | 0.640 | 0.598 | 0.441 | 0.371 | 1.451 | 1.609 | 0% |
| V 20-4-2 | 36 | 0.742 | 0.713 | 0.502 | 0.440 | 1.479 | 1.621 | 20% |
| V 20-4-3 | 32 | 0.735 | 0.705 | 0.508 | 0.447 | 1.447 | 1.577 | 0% |
| V 20-4-4 | 28 | 0.766 | 0.740 | 0.512 | 0.451 | 1.496 | 1.639 | 0% |

\* Data not available

The invention claimed is:

1. A method of producing a multilayer vessel, the method comprising the steps of extruding an inner-layer formulation, a core-layer formulation, and an outer-layer formulation to form an inner parison, an outer parison, and a core parison configured to have a core-parison density different than each of an inner-parison density of the inner parison and an outer-parison density of the outer parison, aligning the inner parison, the core parison, and the outer parison to cause the core parison to be located between the inner parison and the outer parison to cause the core parison to surround the inner parison and to be surrounded by the outer parison to form a multilayer tube, placing the multilayer tube in a mold cavity formed in a mold, and expanding the multilayer tube to cause the multilayer tube to deform so that the outer parison engages an inner surface of the mold and a multilayer vessel having an interior region formed therein is provided and to transform the core parison into a core layer having a core-layer density, wherein a ratio of the core-layer density of the multilayer vessel to the core-parison density of the multilayer tube is in a range of about 1 to about 2.

2. The method of claim 1, wherein a ratio of the core-layer density to the core-parison density is in a range of about 1.0 to about 1.25.

3. The method of claim 2, wherein a ratio of the core-layer density to the core-parison density is in a range of about 1.0 to about 1.1.

4. The method of claim 3, wherein a ratio of the core-layer density to the core-parison density is about 1.

5. The method of claim 1, wherein the multilayer vessel has a vessel density, the multilayer tube has a tube density, and a ratio of the vessel density to the tube density is in a range of about 1.0 to about 1.9.

6. The method of claim 5, wherein the ratio of the vessel density to the tube density is in a range of about 1.0 to about 1.25.

7. The method of claim 6, wherein the ratio of the vessel density to the tube density is about 1.

8. The method of claim 1, wherein each of the inner layer, outer layer, and core layer comprise a polymeric material.

9. The method of claim 1, wherein the core-layer formulation comprises a polyethylene.

10. The method of claim 9, wherein the polyethylene is high density polyethylene (HDPE).

11. The method of claim 10, wherein the HDPE is a HDPE hexene copolymer.

12. The method of claim 1, wherein the core-layer formulation comprises one or more high density polyethylene base resins (HDPE).

13. The method of claim 12, wherein the HDPE is unimodal.

14. The method of claim 13, wherein the unimodal HDPE is a unimodal, high-melt strength HDPE.

15. The method of claim 14, wherein the unimodal, high-melt strength HDPE is electron beam modified.

16. The method of claim 15, wherein the electron beam modified unimodal, high-melt strength HDPE has long chain branching and a melt index of about 0.25 g/10 min.

17. The method of claim 1, wherein the core-layer formulation comprises about 97% to about 99.9% HDPE base resin.

18. The method of claim 17, wherein the core-layer formulation comprises a nucleating agent.

19. The method of claim 18, wherein the nucleating agent is about 0.1% to 15% (w/w) of the core-layer formulation.

20. The method of claim 19, wherein the core-layer formulation lacks talc.

21. The method of claim 19, wherein the core-layer formulation further comprises a slip agent.

22. The method of claim 21, wherein the slip agent is about 0% to 3% (w/w) of the core-layer formulation.

* * * * *